United States Patent

Sauer et al.

[11] Patent Number: 6,034,950
[45] Date of Patent: Mar. 7, 2000

[54] SYSTEM PACKET-BASED CENTRALIZED BASE STATION CONTROLLER

[75] Inventors: John M. Sauer, Naperville; Paul Steinberg, Bartlett, both of Ill.; Jeffrey L. Timbs, Keller, Tex.; Joseph Pedziwiatr, La Grange, Ill.; Steve Lovette, Keller; Thomas L. Sears, Hurst, both of Tex.

[73] Assignee: Motorola Inc., Schaumburg, Ill.

[21] Appl. No.: 08/777,319

[22] Filed: Dec. 27, 1996

[51] Int. Cl.⁷ .............................. H04L 12/56; H04Q 7/00
[52] U.S. Cl. ......................... 370/328; 370/395; 370/466
[58] Field of Search .................................. 370/328, 331, 370/335, 338, 342, 349, 395, 397, 398, 400, 401, 466, 332, 336

[56] References Cited

U.S. PATENT DOCUMENTS

| | | | |
|---|---|---|---|
| 4,672,658 | 6/1987 | Kavehrad et al. | 379/63 |
| 5,184,347 | 2/1993 | Farwell et al. | 370/94.1 |
| 5,195,090 | 3/1993 | Bollinger et al. | 370/94.1 |
| 5,278,892 | 1/1994 | Bollinger et al. | 379/60 |
| 5,363,369 | 11/1994 | Hemmady et al. | 370/60 |
| 5,434,853 | 7/1995 | Hemmady et al. | 370/60 |
| 5,434,854 | 7/1995 | Focarile et al. | 370/60.1 |
| 5,438,565 | 8/1995 | Hemmady et al. | 370/60 |
| 5,446,738 | 8/1995 | Kim et al. | 370/94.2 |
| 5,452,297 | 9/1995 | Hiller et al. | 370/60.1 |
| 5,481,544 | 1/1996 | Baldwin et al. | 370/94.1 |
| 5,513,178 | 4/1996 | Tanaka | 370/58.2 |
| 5,519,700 | 5/1996 | Punj | 370/60.1 |
| 5,600,633 | 2/1997 | Jaisingh et al. | 370/277 |
| 5,615,210 | 3/1997 | Kaiyama et al. | 370/389 |
| 5,638,371 | 6/1997 | Raychaudhuri et al. | 370/347 |
| 5,742,594 | 4/1998 | Natarajan | 370/336 |
| 5,774,461 | 6/1998 | Hyden et al. | 370/329 |
| 5,809,025 | 9/1998 | Timbs | 370/400 |

OTHER PUBLICATIONS

Newman, et al.; "Ipsilon's General Switch Managment Protocol Specification"; Aug. 1996; pp. 1–43.

*Primary Examiner*—Chau Nguyen
*Assistant Examiner*—Soon-Dong Hyun
*Attorney, Agent, or Firm*—James A. Coffing; L. Bruce Terry

[57] ABSTRACT

A base station system (BSS) encompasses a base station controller (BSC), ATM transcoder (AXC), and one or more Base Tranceiver Subsystems (BTS). The AXC provides for the coupling of external mobile subscriber subsystems (MS) and a public switched telephone network (PSTN). The BSC provides for communication with and control of the ATM transcoder hub subsystem. In one embodiment, the ATM transcoder subsystem provides a first set of signals to the BSC subsystem to signal the base station controller as to call flow management data. The BSC is responsive to the first set of signals from the ATM transcoder hub to generate a second set of signals coupled back to the ATM transcoder hub. This second set of signals provides for the control of transcoding and conversion necessary to communicate between a wireless air communications format data and a call management protocol format data utilized in communication to the public switch telephone network. In one embodiment, the communication between the PSTN and the AXC is in an ATM format and in an alternate embodiment a synchronous format is used. The BSC provides control and sequencing of all call control operations. Control is preferably near real-time. In one embodiment, call control operations comprise call setup, breakdown, and hand-off among the ATM transcoder hub (AXC), the Base Transceiver Subsystem (BTS), and the PSTN via a Mobile Switching Center (MSC).

38 Claims, 35 Drawing Sheets

Table 1. Forward Link Processing Steps

| STEP | FROM | TO | PROTOCOL | FUNCTION |
|---|---|---|---|---|
| 1 | MSC | NI | PCM | LAND TO MOBILE DATA |
| 2 | NI | – | – | DATA ACCUMULATION AND AAL1 INTERWORKING |
| 3 | NI | XC | AAL1 | CELL SWITCHING |
| 4 | XC-SAR | XC-VP | | ROUTE CELL TO VP; ENCODE SPEECH |
| 5 | XC-VP | XC-SAR | PCI | ADAPT SPEECH SAMPLE TO AAL5; CELL REPLICATION FOR CDMA SHO |
| 6 | XC | BTSI | AAL5 | CELL SWITCHING TO CIRCUIT-SPAN-LINE SHO LEG |
| 7 | BTSI-CBI | BTSI-SAR | UTOPIA | AAL5 TERMINATION, RELATION TO SCI CHANNEL |
| 8 | BTSI-SAR | BTSI-CktIW | PCI | INTERWORKING SPEECH SAMPLE INTO SCI CHANNEL |
| 9 | BTSI | BTS | STRAU | DELIVERY OF CDMA DATA TO BTS |
| 10 | XC | BTSI | AAL5 | CELL SWITCHING OF PACKET-SPAN-LINE SHO LEG |
| 11 | BTSI-CBI | BTSI-SAR | UTOPIA | AAL5 TERMINATION, RELATION TO SCI CHANNEL |
| 12 | BTSI-SAR | BTSI-PktIW | PCI | INTERWORKING SPEECH SAMPLE INTO AAL-CU |
| 13 | BTSI | BTS | AAL-CU | DELIVERY OF CDMA DATA TO BTS |
| 14 | XC | BTSI | AAL5 | CELL SWITCHING OF PACKET-SPAN-LINE AND CIRCUIT SPAN-LINE CALLS VIA AAL5 |
| 15 | BTSI-CBI | BTSI-SAR | UTOPIA | AAL5 TERMINATION, RELATION TO SCI CHANNEL OR AAL-CU CHANNEL |
| 16 | BTSI-SAR | BTSI-PktIW BTSI-CktIW | PCI | INTERWORKING SPEECH SAMPLE INTO AAL-CU OR SCI CHANNEL |
| 17 | BTSI | BTS | AAL-CU AND ISCE | DELIVERY OF CDMA DATA TO BTS VIA AAL-CU AND ISCE SCI |
| 18 | XC | BTSI | AAL5 | CELL SWITCHING OF PACKET-SPAN-LINE OR CIRCUIT SPAN-LINE CALLS VIA AAL5 |
| 19 | BTSI-CBI | BTSI-SAR | UTOPIA | AAL5 TERMINATION, RELATION TO AAL-CU CHANNE |
| 20 | BTSI-SAR | BTSI-PktIW | PCI | INTERWORKING SPEECH SAMPLE INTO AAL-CU |
| 21 | BTSI | BTS | AAL-CU | DELIVERY OF CDMA DATA TO PACKET-BSS |

*FIG. 16*

Table 2. Reverse Link Data Flow Description

| STEP | FROM | TO | PROTOCOL | FUNCTION |
|---|---|---|---|---|
| 1 | BTS | BTSI | AAL-CU | DELIVERY OF CDMA DATA FROM BTS |
| 2 | BTSI-PktIW | BTSI-SAR | PCI | DEMAP SPEECH SAMPLE FROM AAL-CU SDU |
| 3 | BTSI-SAR | BTSI-CBI | UTOPIA | RELATE SDU TO VCC AND CONVERT VIA AAL5 |
| 4 | BTSI | XC | AAL5 | CELL SWITCHING OF PACKET-SPAN-LINE SHO LEG |
| 5 | BTS | BTSI | STRAU | DELIVERY OF CDMA DATA FROM BTS |
| 6 | BTSI-CktIW | BTSI-SAR | PCI | EXTRACT SPEECH SAMPLE FROM SCI CHANNEL |
| 7 | BTSI-SAR | BTSI-CBI | UTOPIA | MAP SPEECH IN AN AAL5 CELL |
| 8 | BTSI | XC | AAL5 | CELL SWITCHING FROM CIRCUIT-SPAN-LINE SHO LEG |
| 9 | XC-SAR | XC-VP | PCI | TERMINATE AAL5, EXTRACT SPEECH SAMPLES FROM MULTIPLE SHO LEGS, SELECT BEST SAMPLE AND FORWARD TO VP FOR DECODING. |
| 10 | XC-VP | XC-SAR |  | DECODE PCM SPEECH AND ROUTE TO SAR FOR AAL1 INTERWORKING. |
| 11 | XC | NI | AAL1 | CELL SWITHCING |
| 12 | NI | - | - | TERMINATE AAL1, EXTRACT PCM, AND ADAPT TO DS0 ON A SPAN-LINE |
| 13 | NI | MSC | PCM | DELIVER MOBLIE-TO-LAND DATA |
| 14 | BTS | BTSI | AAL-CU AND ISCE | DELIVERY OF CDMA DATA FROM BTS VIA AAL-CU AND ISCE SCI |
| 15 | BTSI-PktIW BTSI-CktIW | BTSI-SAR | PCI | INTERWORKING SPEECH SAMPLE FROM AAL-CU OR SCI CHANNEL |
| 16 | BTSI-SAR | BTSI-CBI | UTOPIA | AAL5 ORIGNATION, RELATION FROM SCI CHANNEL OR AAL-CU CHANNEL TO VCC |
| 17 | BTSI | XC | AAL5 | CELL SWITCHING OF PACKET-SPAN-LINE AND CIRCUIT SPAN-LINE CALLS VIA AAL5 |
| 18 | BTS | BTSI | AAL-CU | DELIVERY OF CDMA DATA FROM REMOTE PACKET-BSS |
| 19 | BTSI-PktIW | BTSI-SAR | PCI | INTERWORKING SPEECH SAMPLE FROM AAL-CU INTO AAL5 |
| 20 | BTSI-SAR | BTSI-CBI | UTOPIA | AAL5 ORIGINATION, RELATION OF AAL-CU CHANNEL TO VCC |
| 21 | BTSI | XC | AAL5 | CELL SWITCHING OF PACKET-SPAN-LINE CALLS VIA AAL5 |

FIG. 17

SYSTEM PACKET-BASED CENTRALIZED BASE STATION CONTROLLER

FIELD OF THE INVENTION

The present invention relates generally to a communications system, and in particular, to a method and apparatus for switching data in the communications system. Still more particularly, the present invention relates to a method and apparatus in a wireless communications system for switching a plurality of datagrams (e.g., packets) that are converted from and into cells, for use with a cell-based switching network, and thereby forming a data transmission stream.

BACKGROUND OF THE INVENTION

Presently available communications systems primarily use circuit-based switching transmission systems. However, asynchronous transfer mode (ATM) switch technology has recently become available, giving rise to new choices. ATM is used within telecommunications switching networks and may carry a wide variety of traffic types from different applications such as voice data, image data, fax data, modem data, video data, computer data, multimedia data, and program code data. Furthermore, the use of code division multiple access (CDMA) for wireless communications systems is becoming a method of choice for data and voice transport, due to its inherent variable rate traffic channel frame organization. The influence of variable-length packet transport inherent to CDMA, and fixed-length cell-switching inherent to ATM, requires efficient conversion techniques at the interface between the wireless transport and the switching network. In the conversion of data streams into ATM cells, the presently available systems focus on transporting CDMA speech packets via variable rate packets by utilizing off-the-shelf segmentation and reassembly (SAR) devices, or data optimized conversion devices, yielding a more complex and costly implementation.

Existing commercial off-the-shelf SAR devices are available to perform constant-bit-rate (CBR) and/or variable-bitrate (VBR) traffic for ATM cell conversion. SAR involves chopping packets into cells and reassembling them for multiple-receive cells to form a single large packet. More information on off-the-shelf SAR devices may be found in IgT AAL5 SAR Processor, WAC-020-A; Data Sheet, Motorola SPS ATM AAL SAR Controller With Framer, MC92516; Data Sheet, TI SAR Device 0 with PCI Host Interface, TNETA1562; Data Sheet, TI SAR Device with Integrated 64-bit PCI Host Interface; and, TNETA1570: Data Sheet. However, these devices were developed for desktop applications and are primarily intended to handle data (i.e. non-voice) information. Furthermore, as a result of the intended application, most devices must operate within a PCI-bus environment, relying upon either an integrated or external controller and host-memory. Also, in order to expand the range of applications in which these devices may operate, embedded firmware is typically used to perform a specific ATM adaptation layer (AAL) conversion. Therefore, the AAL may be changed by downloading and enabling new firmware. However, the dependence upon firmware to process-differing AALs, as well as upon PCI architectures for interacting with computer-based peripheral devices, along with the inability to perform per-VC mixed mode AALs (e.g., AAL 1 or AAL 5 simultaneous on various VC) limits the usefulness of such devices in voice applications. More information on PCI architecture may be found in *PCI Local Bus Specification*, Rev 2.0, PCI Special Interest Group, Hillsboro, Ore., or *PCI System Design Guide*, Rev 1.0, PCI Special Interest Group, Hillsboro, Ore.

In particular, PCS systems employing the CDMA air-interface utilize variable-rate speech codecs to efficiently utilize the frequency spectrum and to minimize cross-interference among other simultaneous users. Two methods (synchronous backhaul and asynchronous backhaul) are commonly known in the art for back hauling downconverted and digitized data from a base termination site (BTS) to a transcoder for conversion into a format compatible with the public switch telephone network (PSTN). Since the BTSs are located at separate locations from a central base site controller (CBSC), separate point-to-point span line interfaces are typically provided between the BTS and the CBSC for backhaul. Backhaul relates to the mapping of information frames onto physical media (e.g., electrical or optical) for transport between the CBSC and the BTSs. Network operators seek to minimize backhaul costs associated with the physical access plant containing the physical connections in a communications system. Different techniques are utilized to achieve this operating efficiency, such as attaining higher utilization (i.e., transport of more calls) on the same fabric.

A synchronous backhaul approach may be utilized, whereby the variable-rate voice packet is segmented into one or two bit subslots and sent via a 16 kbps synchronous channel via either a T1 or E1 span line. More information on this approach may be found in TIA TR46 Ad-Hoc Group, "Voice Frame Format" by Karl Lewis of Motorola, Aug. 28, 1995. The CDMA air-frame is converted into a synchronous, constant-bit size packet, consisting of 320 bits that are sent at 2 bits per 125 microsecond frame over 160 frames. The synchronous backhaul approach utilizes a 320-bit fixed-length packet that contains the CDMA voice data, synchronization information, and other overhead. By contrast, the asynchronous backhaul approach utilizes variable-sized packets typically ranging from 6 to 38 bytes plus overhead for CDMA. The appropriate AAL technique for carrying variable rate data, such as voice/data, is AAL-CU (also referred to as AAL2).

A second backhaul approach may be utilized whereby the variable-sized packet is encapsulated in an asynchronous packet (frame relay, FUNI (Frame User Network Interface), etc.) and sent via a frame format via either a TI or E1 span line. The advantage of the asynchronous technique over the synchronous backhaul technique is that the available bandwidth is used more efficiently, since only relevant information is sent per packet transfer in the asynchronous data stream--versus a fixed 320 bits for the smallest packet size in the synchronous data stream. The asynchronous interface partially utilizes a single AAL2-formatted ATM cell payload (occupying from 8 to 24-bytes plus overhead). Thus, more subscribers/calls may be transported over the same span line than may be supported by the synchronous approach.

However, the advantage of the synchronous backhaul technique over the asynchronous backhaul technique is that processing is simplified. Furthermore, the synchronous backhaul technique is compatible with the embedded infrastructure of circuit switching network topology. As ATM cell-switching experiences rapid growth, an efficient solution must be provided to realize the bandwidth efficiencies of newer asynchronous/packet backhaul while ensuring backward compatibility wit presently used synchronous backhaul in personal communication system (PCS)/CDMA communications system. In either case (synchronous or asynchronous), the data is optimally transferred within the CBSC utilizing a cell switching system. Therefore, the packet or frame from the span line must be converted into an ATM cell utilizing the appropriate ATM adaptation layer (AAL) technique, AAL 5.

The AAL5 method may support packet sizes ranging from 0 to 64 k octets by segmenting each packet into smaller sized groupings for encapsulation within an ATM cell payload. The final cell utilizes 8 octets of the 48-octet payload for AAL 5-specific information. However, observation of the data format present within a CDMA air-frame for ⅛; ¼; ½; and full rate speech shows that the entire air-frame may be encapsulated within a single AAL 5-format.

Currently, the most prevalent method of transporting data between the BTS and the CBSC is via the synchronous backhaul approach. However, cell-based (asynchronous) backhaul approaches promise better utilization of the backhaul transmission fabric, since it utilizes only the amount of bandwidth required rather than a fixed amount of bandwidth, regardless of the amount occupied (as required by the synchronous backhaul approach). The introduction of such asynchronous-based backhaul is therefore dependent upon an efficient method of switching packets within a Base Station Subsystem (BSS).

It is therefore desirable to provide a BSS that is independent of a Mobile Switching Center (MSC). Further, a system that provided a switching system that utilized cell-based switching, while maintaining compatibility with both cell and circuit-based transmission formats, would be an improvement over the prior art.

BRIEF DESCRIPTION OF THE DRAWINGS

FIG. 9.B shows the NI state flow for PSTN to MS, in accordance with the present invention;

FIG. 9.C shows the NI state flow from MS to PSTN, in accordance with the present invention;

FIG. 16 shows the forward link processing steps for the AXC, in accordance with the present invention; and FIG. 17 shows the reverse link data flow steps of the AXC, in accordance with the present invention.

DETAILED DESCRIPTION OF A PREFERRED EMBODIMENT

Figure 1A:
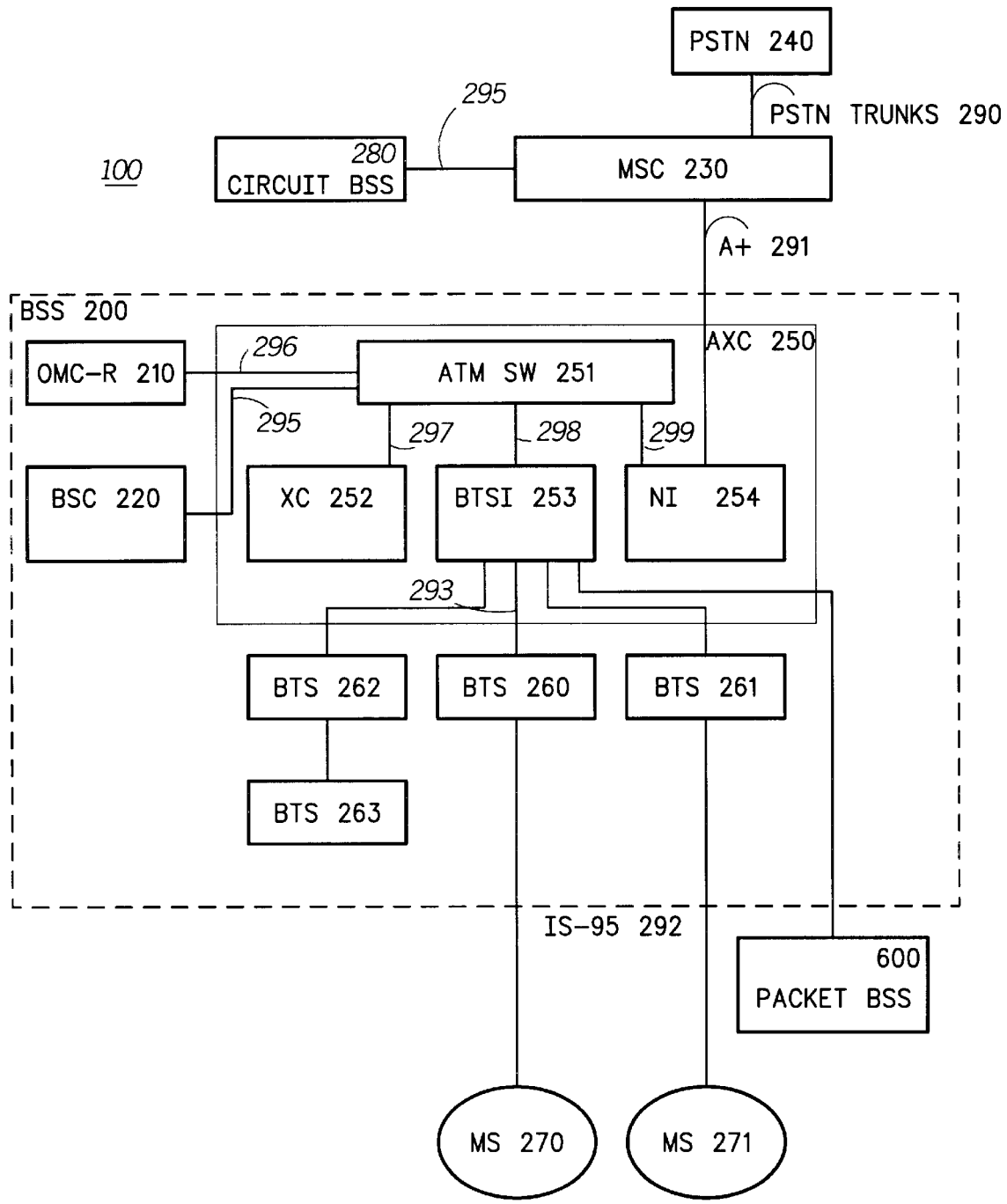
FIG. 1a is a diagram of a communications system, in accordance with the present invention.

While this invention is susceptible of embodiment in many different forms, there is shown in the drawings, and will be described herein in detail, specific embodiments thereof with the understanding that the present disclosure is to be considered an exemplification of the principles of the invention, and is not intended to limit the invention to the specific embodiments illustrated.

The present invention provides a method and apparatus for converting a data transmission stream for transportation within a cell based network. In particular, the present invention provides a novel method and apparatus for converting both asynchronous data streams and synchronous data streams into cells prior to entering a cell-based network using optimized hardware for processing these two types of data streams.

This invention is directed to a system, an architecture, subsystem, and method to handle and manage mobile radio system connections in ways superior to the prior art. In accordance with one aspect of the present invention, cell based technology allows a broader CDMA soft hand-off coverage area without requiring transmission through a MSC and thus, is transparent to the MSC. The introduction of packet technology increases the capacity and flexibility of the BSS system.

FIG. 1a provides a network view of one embodiment of the present invention. The subsequent figures and tables illustrate subsystem views describing the features, functions, and interfaces of the Cellular Base Station, in accordance with the present invention. As shown, Base Station subsystem (BSS) 200 acts between one or more Mobile Station radio devices (MS) 270, 271 and the Public Switched Telephone Network (PSTN) 240 to translate and handle the radio specific nature (such as CDMA soft hand-off) of the mobile traffic; the handling or the management of subscriber validation of transactions across the IS-634 ("A+") interface 291 to allow that to happen, and the handling of translation of the mobile digits etc. into the IS-634 interface to the MSC, etc.

With continued reference to FIG. 1a, a communications system 100 is depicted in which the present invention may be implemented. Communications system 100 includes a BSS 200, which in the depicted example, is a cell-based network providing switching functions for processing traffic from various sources such as voice, data, image, and video sources (not shown). BSS 200 provides cell-switching instead of circuit switching, in accordance with a preferred embodiment of the present invention. BSS 200 receives and sends data to and from cellular regions that include base transceiver subsystems (BTSs) 260–263. These BTSs send and receive radio signals in digital signal air interface protocol (DSAIP) to and from mobile telephones and packetize the communications content of the radio signals into electronic data that is transported, in data packets, to base transceiver subsystem interface (BTSI) 253 for transport within BSS 200. These radio signals may be CDMA signals, according to a preferred embodiment of the present invention.

The received radio signals are packetized into electronic packet data units (PDUs) (not shown), or alternatively, the PDUs may be further segmented, depending on whether the span line is synchronous or asynchronous, and then transported to BTSI 253 via span lines 293 connecting BTSs 260–263 to BTSI 253. These span lines may be TI or E1 lines. (It should be noted that the data streams of PDUs entering BSS 200 are considered uplink data streams, while data streams exiting BSS 200 are considered downlink data streams.) At the BTSI 253, the PDUs are converted into ATM cells that are sent through the AXC 250 and then converted into an appropriate format for the various destinations such as public switch telephone network (PSTN) 240. Background information on ATM technology may be found in Goralski, Introduction to ATM *Networking*, McGraw Hill, Inc., (1995), ISBN 0-07-024043-4 and in McDysan and Spohn, *ATM Theory and Application*, McGraw Hill, Inc. (1995), ISBN 0-07-060362-6.

More information on the CDMA standard can be found in *Mobile Station-Base Station Capability Standard for Dual-Mode Wideband Spread Spectrum Cellular System, TIA/EIA Interim Standard*, IS-95, July 1993. The present invention is not limited to any particular type of wireless system, and CDMA, Global System for Mobile Communications (GSM), iDEN™, and any other digital wireless standard may be used with the present invention.

As illustrated in FIG. 1a, BSS 200 includes four subsystems: an Operations and Maintenance Center-Radio (OMC-R) 210, a Base Station Controller (BSC) 220, an ATM Transcoder (AXC) 250, and Base Transceiver Subsystems (BTS) 260–263. (It should be noted that the figure purposely does not illustrate a cardinality relationship (e.g., multiplicity of layers) between the subsystems and subcomponents. For example, the XC 252, BTSI 253, NI 254, and BSC 220 can each be one or multiple ones of each or any of them, depending on how many BTSs are supported. Although four BTSs (260, 261, 262, 263) are illustrated, there can be hundreds of them in some applications. The present invention is not limited to any cardinality relationship. A distinct Packet BSS 600 is shown to illustrate Soft Hand-off (SHO) between distinct systems. This BSS may or may not be an instantiation of the BSS described herein, but it must support a common packet protocol.) The network architecture includes the A+ interface 291 and is Air Interfaces (e.g., IS95), as described hereafter. The A+ interface for both international and U.S. cellular markets uses IS-634, which is circuit switched pulse code modulation (PCM) and call control. The goal is to provide digital cellular services to existing cellular switches using packet technology. This interface contains provisions for setting up and tearing down calls, subscriber registration, special services such as short message service vocoder bypass, and inter-BSC handoff. The management interface is minimal, in that it only provides terrestrial circuit management capabilities.

The Operations Maintenance Center-Radio (OMC-R) subsystem 210 is the operations administration and maintenance and provision network manager for the BSS 200 and all the System Management functions reside thereon for the BSS. A network management center 210 can handle multiple BSSs 200 and multiple MSCs 230. The OMC-R 210 for each BSS 200 performs network management for multiple BSSs 200. The OMC-R is the concentration point for the more complex aspects of operations, administration, maintenance and provisioning (OAM&P), and is explicitly not involved in call processing functions (i.e., it is not in the call path). The remainder of the subsystems are capable of operating without the Operations Maintenance Center-Radio subsystem and the OMC-R subsystem 210 is able to initialize itself without affecting the ability of the other subsystems to provide service.

The management functions provided by the Operations Maintenance Center-Radio subsystem 210 include 1) the administrative (Recent Change & Verify, Provisioning) side of the system; 2) non-real time configuration control; 3) remote emergency control (e.g., remote reset, configuration, etc.) of the subsystems; 4) problem analysis and resolution (alarm correlation, trending analysis, etc.); 5) a user interface; 6) performance analysis and storage of statistics; and 7) storage of backup software loads. The Management functions provided by the OMCR subsystem 210 may be best viewed as very high level entities not involved in the real time aspect of the system (except for the emergency craft control). These management functions consist of Fault Management, Alarm Management, Initialization and Download, Configuration Management, Performance Management, and User Interface. The Operations Maintenance Center-Radio subsystem 210 has a standard Telecommunications Management Network (TMN) interface to each of the managed subsystems. This interface is transported via ATM (AAL-5) by the AXC. These functions are well documented in the art, such as in the user manuals of the US CDMA System Specification. Motorola Supercell™ centralized base station controller (with SC9600 BTS).

The Base Station Controller 220 is a managed subsystem responsive to the Operations Maintenance Center-Radio subsystem 210 and also provides its own subsystem management functions. The Base Station Controller subsystem 220 need not have the management interface association established in order to provide service. Assuming that the Base Station Controller subsystem 220 is loaded with code and data, then the Operations Maintenance Center-Radio subsystem 210 is not required for the Base Station Controller subsystem 220 to function.

The BSC is managed by the OMC- R 210 via a Telecommunications Management Network (TMN) Q3 interface 119 and the BSC performs the subsystem management functions, as next described. The BSC receives configuration data and software loads from the OMC-R and it reports alarms to the OMC-R. The BSC is responsible for collecting and logging call performance data from the network elements involved in a given call (XC and BTS) and for providing it to the OMC-R upon demand. The BSC interacts with the OMC-R and other BSS subsystems to effect operations and maintenance activities associated with the BSS resources (XC, BTS, and MSC resources).

The principal functions provided by the Base Station Controller subsystem 220 are: 1) real time call control; and 2) subsystem management. The management functions provided by the Base Site Controller subsystem 220 are those that require real time response. The other functions are provided by the OMCR 210. The Base Site Controller subsystem 220 interacts with other elements via external and internal signaling protocols to affect call control activities. The external protocols are the IS-634 (A+) interface to the MSC, and the CDMA IS-95A interface to the mobile stations.

The BSC 220 interacts with the OMC-R 210 for operations and maintenance. For call control, the BSC interacts with the Base Transceiver Subsystem Interface (BTSI) 253, the transcoders (XC) 253, the Base Transceiver Subsystems (BTSs) 260–263 and the NI (such as a Mobile Switching Center Network Interface (NI 254)). From a control point of view, the BSC 220 also interacts with the MSC 230. The BSC 220 doesn't communicate directly to the PSTN 240. These functions are well documented, such as in the "B1" document for the US CDMA System Specification.

The Base Station Controller Subsystem 220 performs the signaling interface with the MSC 230, radio resource management (i.e., channel allocation), and coordination of radio resources to effect operations such as originations, terminations, and handoffs. A more detailed representation of these functions and capacity are demonstrated in the system ladder diagrams (FIG. 13a–f, FIG. 14a–f, and FIG. 15a–g), and in the accompanying descriptions later.

All the control messaging on these ladder diagrams revolves around the BSC 220.

The BSC 220 operation includes real-time dynamic call control. Dynamic call control means that as the call state is reconfigured, as calls are originated/torn down and as they are handed-off, the BSC 220 sets up all the call state changes that are necessary. In doing so, it manages the resources that are necessary to construct the call. The resources are the transcoder's voice processing units, PSTN 240 connections, and channel element resources on the radio side (BTS) 260–263. The voice processing and transcode functions are both contained within the XC 252. The voice processing is contained in the XC 252, in the vocoder (not shown). The channel element is contained in the BTS 260–263, and is the radio-link entity to the mobile subscriber (MS) 270, 271. The BSC's function is to allocate those and piece them together across the system to construct the call. As part of call setup, the BSC must terminate the control signaling to the PSTN side of the network, which may involve communication with the MSC 230 to orchestrate the call setup on the rest of the network out to the PSTN 240.

The BSC 220 manages the ATM connections between the XC 252, NI 254, BTSI 253, and ATM switch 251 for voice paths to connect the voice processor of the XC 252 and the channel elements of the BTS/BTSI for coupling to the NI 254. Within the BTSs 260–263, there are a plurality of channels and the radio resources associated with the channels that the BSC 220 allocates and manages, responsive to the BSC 220, via the ATM switch 251, and via the BTSI 253. There are two types of data that are communicated using the internal ATM format, voice and control, wherein the BSC 220 sends only control data.

The BSC 220 provides means for configuring the ATM switch 251 to selectively provide for the coupling of voice data between the subsystems of the transcoder (the AXC) 250 and therefrom to the BTSs 260–263, via the BTSI 253, or via the NI 254 out to the MSC 230 and on to the PSTN 240. The BSC 220 configures and controls access to the ATM switch 251 to permit the state flow operation. The BSC 220 is responsive to control signals (originating either from the PSTN 240 through the MSC 230 or from the MSs 270, 271 through the BTS 260–263 to the BTSI 250), which control signals activate the BSC 220 to execute a control algorithm or logic, as necessary. This appropriately configures the elements and sequences the processing of the incoming data from the NI 254 or BTSI 253 through a combination of the elements within the BSS 200, including multiple paths through the ATM switch 251 and the AXC 250, in order to accomplish the requested call control signal function.

The BSC 220 further provides means for connection management and configuration of the ATM switch 251 to permit the communication and data flow necessary to provide for the AXC 250 operation, to provide for transmission format and voice transcoding format conversion back and forth between the air protocol and the land-line protocol.

As the Base Station Controller (BSC) subsystem 220 constitutes the call processing control platform for the Base Station subsystem 200, it is the central control entity of the majority of the call control message traffic. The BSC 220 manages the BSS 200 call resources including radio resources (e.g., channel elements, carriers, and CDMA walsh codes), voice processing resources (XCDR VPs), and external trunks to the MSC. It contains the complete view of the BSS call state for each active transaction; this state is highly dynamic due to call reconfiguration (handoffs) and traffic arrival/departure. The platform must provide the capability of preserving stable call state across any single failure. Importantly, the Base Site Controller subsystem 220 is scalable. This is accomplished through incremental additions of processing elements. It also provides sufficient memory to store the call processing configuration data. The BSC is physically a computation engine similar to commercially available platforms, such as those manufactured by Tandem Inc., Sun Inc. [IMP], Stratus Inc., etc.) that terminates an ATM interface with the AXC (ATM Switch) for control message transport. The various control protocols (IS-634, "ATM routing control, or ARC, and internet control protocol, or ICP) are transported by this interface.

Figure 1B:
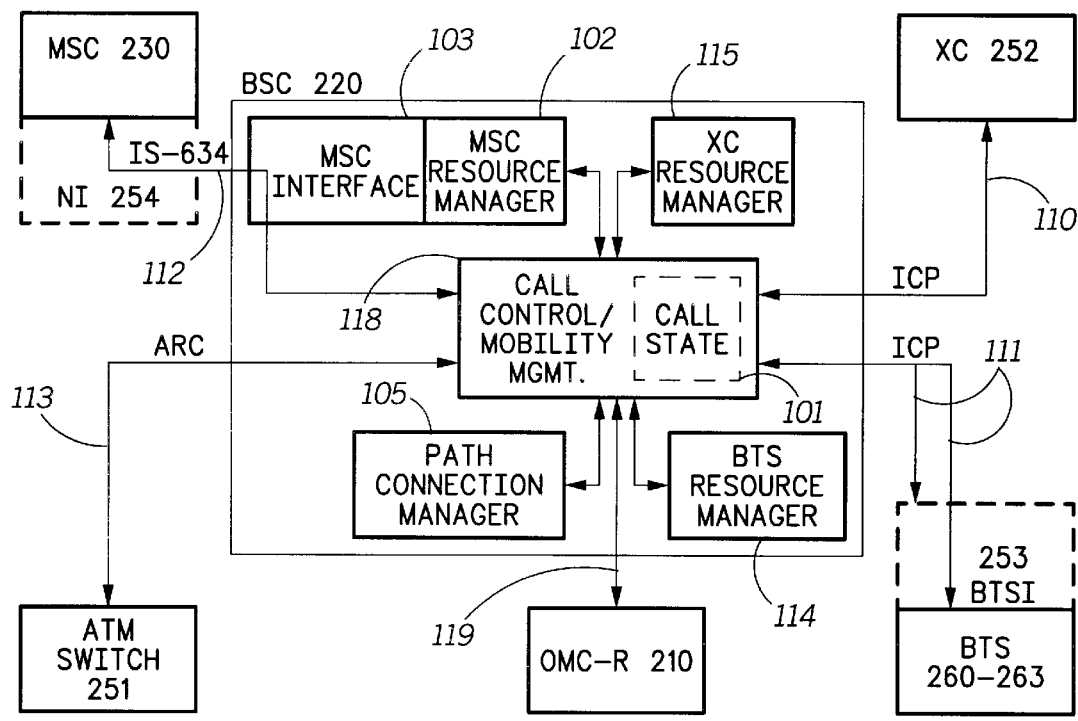
FIG. 1b is a Base Station Controller (BSC) block diagram, in accordance with the present invention.

Referring to FIG. 1b, the BSC 220 is comprised of the following internal functions:

Call Control / Mobility Management 118 is the structured logic that establishes, maintains, and removes call state. This contains the algorithms necessary to configure the XC, BTS and ATM switch to accomplish this. It contains internal call state 101, which is used to keep track of the current call configuration and/or algorithmic activities associated with manipulating call state.

The MSC Resource Manager 102 is used by Control/Mobility Management to allocate, free and state manage PCM call/data paths between the MSC 230 and the BSS.

The MSC Interface 103 is the function used by Call Control/Mobility Management uses to abstract specific MSC interface commands (e.g. IS-634 messages) 112 into general A-interface call control operations associated with the PSTN. This control path is physically via the ATM Switch 251 and NI 254 which may take several different forms (e.g. SS7 encapsulated within ATM circuit emulation).

The Path Connection Manager 105 is the function used by Call Control/Mobility Management to interact with the ATM Switch 251, via the ATM Routing Control Protocol (ARC) 113, to configure/release connections between other BSS entities (XC 252, BTSI 253, and NI 254).

The BTS Resource Manager 114 is the function used by Call Control/Mobility Management to allocate, free and state manage radio resources including channel elements. The BSC communicates with the BTS 260–263 and BTSI 253, via the ATM Switch 251, using the Internal Control Protocol (ICP) 111.

The XC Resource Manager 115 is the function used by Call Control/Mobility Management to allocate, free and state manage voice and data processing resources necessary for the CDMA selector function and transcoding. The BSC communicates with the XC 252 via the ATM Switch 251 using an Internal Control Protocol (ICP) 110.

The Base Station Controller (BSC) subsystem 220 provides real time call processing functionality. It performs the signaling interface with the MSC 230, radio resource management (i.e., channel allocation), and coordination of radio resources to effect operations such as originations, terminations, and handoffs.

The call state models are used by the BSC 220 and the call state models are used by the BTS 260–263 and XC 252 as well as the MSC 230. The call state model determines which elements are needed in which order, in order to accomplish a particular call set-up or breakdown, and which message to send where.

The XC 252 is stand-alone but the BSC 220 manages the set-up and transfer of operations to the XC 252 and other subsystems to effect control to accomplish some call state model. The call state model defines the series of subsystems that are to be used and in what order, such as represented in the ladder state flow diagrams (see FIG. 13*a*–*f*, FIG. 14*a*–*f*, and FIG. 15*a*–*g*), to accomplish call set-up, call breakdown, hand-off and other functionality as needed. The BSC 220 provides a structured logic in order to accomplish the call state model. Using this logical structure, the BSC 220 manages of the various call connection paths and set-up and transfer of operations back and forth between them, via the ATM switch 251.

Figure 2:
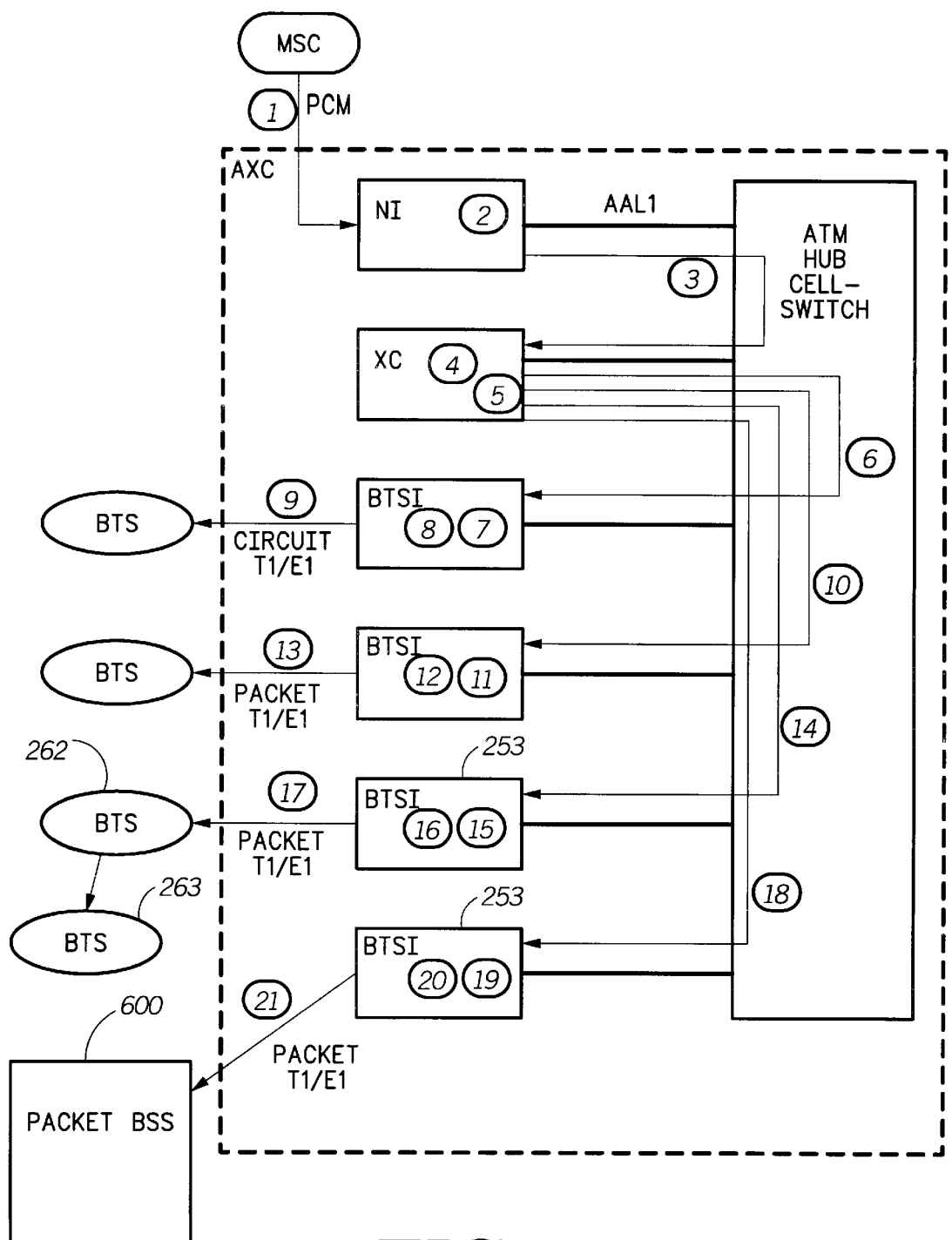
FIG. 2 illustrates the AXC subsystem forward direction flow, in accordance with the present invention.

Referring to FIG. 2, the data flow within the system structure for the AXC 250 (shown in FIG. 1) is illustrated in conjunction with Table 1. Referring to FIG. 2 and Table 1, at step 1, the data is communicated from the MSC 230 to the NI 254 in a s PCM protocol, performing a land to mobile data communication function. At step 2, the network interface NI 254 provides for data accumulation and AAL1 interworking. At step 3, the data flows from the network interface to the XC 252 transcoder utilizing an AAL1 protocol to provide for cell switching function. Thus, the cells are communicated from the NI 254 to the XC 252 via the ATM hub/switch 251.

At step 4, the transcoder 252 communicates within its architecture between its segmentation and reassembly (SAR) cell processor (not shown) and its voice processor (not shown), to route the cell to the voice processor for encoding of the speech. At step 5, communication within the XC 252 is provided from the voice processor to the SAR cell processor, utilizing a packet channel interface (PCI) protocol, to provide for the adapting of the speech sample to an AAL5 format, and further provides for cell replication for CDMA soft handoff (SHO). At step 6, the transcoder XC 252 communicates the data cells to the BTSI 253 via the ATM switch 251, to provide for cell switching to the circuit span line, soft handoff leg. At step 7, the BTSI 253 provides for inter-communication between its cell bus interface (CBI) and its SAR processor, utilizing a PCI protocol, to provide for AAL5 termination, and to relate to an serial channel interface (SCI) channel. At step 8, communication of data is again within the BTSI 253, from the SAR subsystem (not shown) to the interworking subsystem (not shown), utilizing a PCI protocol, to provide for interworking of the speech sample into an SCI channel. At step 9, the data is communicated from the BTSI 253 to the external BTS 260–263, utilizing an internal speech/data and control encoding (ISCE) protocol, to provide for delivery of the data as CDMA data to the BTS.

Alternatively, the XC 252 can proceed from step 5 to step 10, where the data flow is from the transcoder XC 252 to the BTSI 253 via the ATM switch 251 utilizing an AAL5 protocol, to provide for cell switching of packet-spanline SHO legs. At step 11, communication is within the BTSI 253, from the CBI subsystem to the SAR subsystem, utilizing a UTOPIA protocol, to provide for AAL5 termination, and to provide a relation to an SCI channel. At step 12, communication is again within the BTSI 253, from the SAR subsystem to an interworking subsystem, wherein PCI protocol is utilized, to provide the function of interworking the speech sample into AAL-CU (AAL2) format. At step 13, data communication is from the BTSI 253 to an external BTS, in AAL-CU (AAL2) protocol, to provide delivery of CDMA data to the external BTS utilizing a packet interface, as opposed to the circuit interface of step 9.

Figure 3:
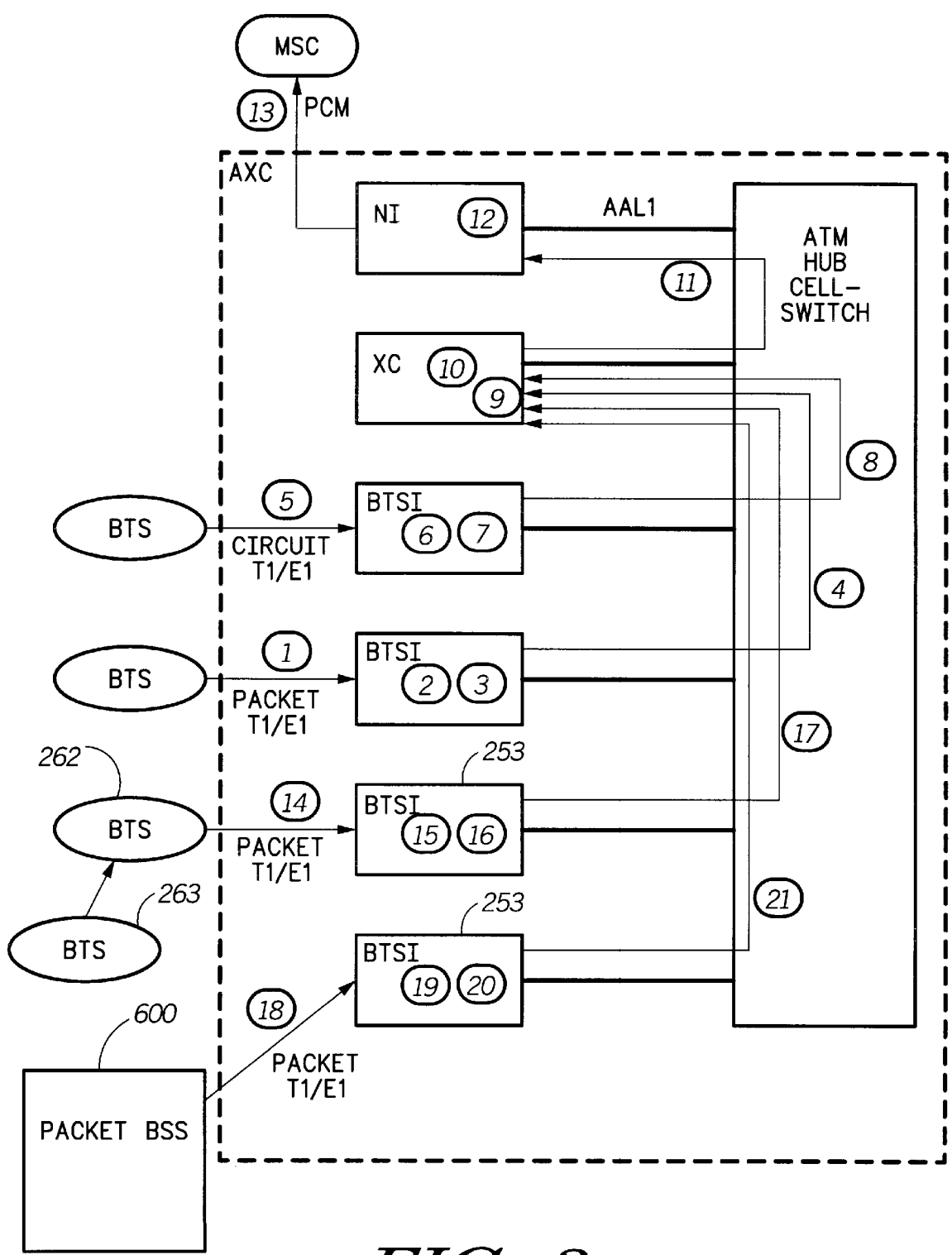
FIG. 3 illustrates an AXC subsystem reverse direction data flow diagram, in accordance with the present invention.

Referring to FIG. 3, a reverse direction data flow diagram, analogous to the AXC 252 (shown in FIG. 1) forward data for diagram of FIG. 2, is illustrated, showing the data flow within the AXC 252 structure. Referring now to FIG. 3 in conjunction with Table 2, at step 1, communication is received from an external BTS 260–263 and the packet communication on a T1 or E1 connection, utilizing an AAL-CU protocol, to provide for delivery of CDMA data from the external BTS 260–263. At steps 2 and 3, data flow is within the BTSI 253. In step 2, the BTSI 253 provides for demapping the speech sample from the AAL-CU Service Data Unit (SDU). Internal data communication within the BTSI 253 is in the PCI protocol, from the external packet interface subsystem to the SAR subsystem. At step 3, communication is from the SAR subsystem to the CBI subsystem, utilizing UTOPIA protocol, which provides for the relation of the SDU data to the virtual channel connection (VCC) and provides for conversion to AAL5 protocol.

At step 4, the communication is from the BTSI 253 to the XC 252, utilizing AAL5 protocol, to provide cell switching via the ATM switch 251 of the packet-spanline SHO leg. Alternatively, as shown at step 5, the BTS 260–263 can communicate in a circuit communications, from the BTS 260–263 to the BTSI 253 using a ISCE protocol, to provide delivery of the CDMA data from the BTS 260–263. At steps 6 and 7, processing of the received CDMA data is provided, at step 6 providing for the extraction of the speech sample from the SCI channel utilizing a PCI protocol for communication within the BTSI 253, and at step 7 communication from the SAR subsystem to the CBI subsystem is provided in the UTOPIA format, where the BTSI 253 provides for the mapping of speech into an AAL5 cell. At step 8, the BTSI 253 communicates the AAL5 data to the XC 252, utilizing the AAL5 protocol, to provide for cell switching via the ATM switch 251 from the circuit spanline SHO leg. In either case, from step 4 or step 8, processing continues at step 9, where data flow is within the transcoder from its SAR cell processor subsystem to the voice processor subsystem utilizing a PCI protocol, to provide for termination of the AAL5 data, and to provide for extracting of speech samples from multiple SHO legs, to select the best sample and to forward it to a voice processor for decoding.

At step 10, the XC 252 voice processor (not shown) decodes the PCM speech, and routes it to the transcoder SAR cell processor per AAL1 and interworking. At step 11, the XC 252 communicates the data to the NI in an AAL1 protocol, via the ATM switch 251 to provide for cell switching and communication to the NI 254. At step 12, the NI 254 provides for termination of the AAL1 data, and extracts the pulse code modulation (PCM) information, and adapts to a DS0 protocol on a spanline. At step 13, the NI 254 communicates to the external MSC, utilizing the PCM protocol, to provide for delivery of the mobile to land data.

Referring again to FIG. 2, at step 14, the XC 252 communicates data to the BTSI 253 via the ATM switch 251, to provide for cell switching to the span-line for communication to BTS 262 and BTS 263 via step 17. At step 15, the BTSI 253 provides for inter-communication between its cellbus interface and its SAR processor, utilizing a UTOPIA interface, to provide for AAL5 termination, and to relate to either an SCI channel or a packet identifier of a particular span-line. At step 16, communication of data is again within the BTSI 253, from the SAR subsystem (not shown) to the interworking subsystem (not shown), utilizing a PCI protocol, to provide for interworking of the speech sample into an SCI channel portion of the span-line interface and into a packet portion of the span-line interface. At step 17, the data is communicated from the BTSI 253 to the external BTS 262 and 263 over a single span-line to provide for delivery of the data as CDMA data to both BTSs.

Referring now to FIG. 3 in conjunction with Table 2, at step 14, communication is received from external BTS 262 and the packet communication on a portion of the T1 or E1 connection utilizing an AAL-CU protocol, as well as from external BTS 263 and an SCI channel on another portion of the same T1 or E1 connection to provide for delivery of CDMA data. At steps 15 and 16, data flow is within the BTSI 253. In step 15, the BTSI 253 provides for demapping the speech sample from the AAL-CU Service Data Unit (SDU) via a packet interworking unit (not shown) which processes certain provisioned channels within the T1 or E1 connection for packet protocol via AAL-CU termination. In step 15, the BTSI 253 also provides for demapping of the speech sample from an SCI via a circuit interworking unit (not shown) which processes certain provisioned other channels within the same T1 or E1 connection for circuit protocol via ISCE termination. Internal data communication within the BTSI 253 is in the PCI protocol, from the external BTS interface interworking subsystem to the SAR subsystem. At step 16, communication is from the SAR subsystem to the CBI subsystem, utilizing UTOPIA protocol, which provides for the relation of the SDU data to VCC as well as for the relation of the SCI data to a VCC and provides for conversion to AAL5 protocol.

At step 17, the communication is from the BTSI 253 to the XC 252, utilizing AAL5 protocol, to provide cell switching via the ATM switch 251 of the packet-spanline SHO leg. The communication from the BTSI 253 need not be to the same XC 252 for various calls arriving from BTSs 262,263.

Referring again to FIGS. 2 and 3, a distinct Packet BSS 600 interface 21 provides a path for inter-BSS SHO traffic support. The BTSI processing is similar to that described above for intra-BSS packet SHO legs. The same processing described in Tables 1 and 2 for intra-BSS SHO management is used.

Figure 4:
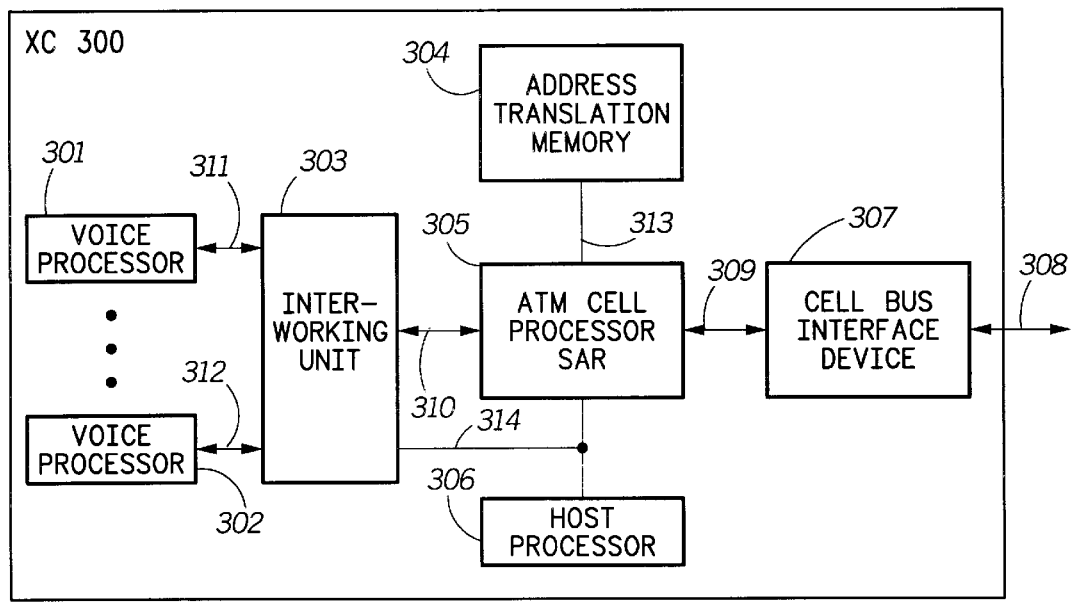
FIG. 4 shows an XC functional block diagram, in accordance with the present invention.

Referring to FIG. 4, functional block diagram of the transcoder is illustrated, for a transcoder 300. The transcoder 300 is comprised of a cell bus interface 307 which couples to the cell bus 308 and therefrom to the ATM switch for communication with the other subsystems of the AXC. The cell bus interface 307 couples the cell data via interface 309 to an ATM cell processor SAR cell processing subsystem 305. The SAR subsystem 305, under control of an XC host processor 306, and in conjunction with an address translation memory 304, provides for conversion of the incoming data to a PCI protocol for communication to the interworking unit 303 via bus 310. Communication between the interworking unit and the host processor is provided via bus 314. Interworking unit 303 couples the converted data to the appropriate voice processor 301 or 302 via respective buses 311 and 312, where the speech is encoded, and then communicated back via the interworking unit to the ATM SAR cell processor subsystem 305, which responds to the host processor 306 and address translation memory 304, and in conjunction with control signals from the interworking unit 303, provides for adaption of the speech sample to AAL5 protocol for communication via the cell bus interface 307 back to the ATM switch for coupling to the appropriate originating device. The operation of the transcoder varies depending on the forward link or reverse link processing direction, and is described in further detail with reference to FIGS. 2 and 3 in Tables 1 and 2.

Figure 5:
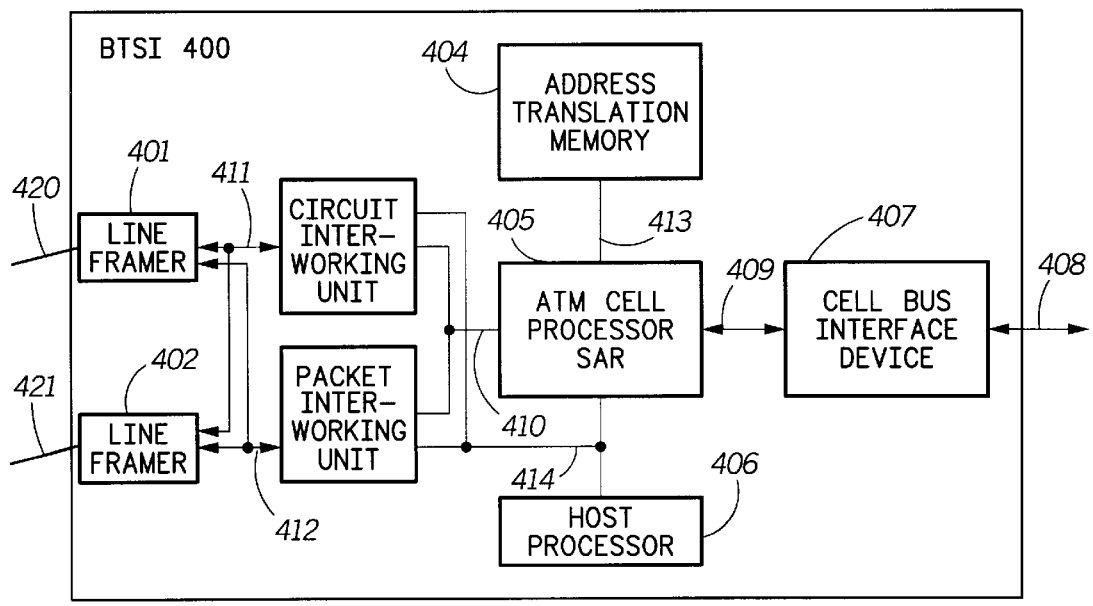
FIG. 5 is a BTSI functional block diagram, in accordance with the present invention.

Referring to FIG. 5, the BTSI functional block diagram is illustrated, for a BTSI set system 400. The BTSI subsystem couples to external BTS's via couplings 420 and 421 respectively, coupled to line framers 401 and 402 respectively. The BTSI 400 is coupled to the ATM switch (not shown) via coupling 408 which couples to the cell bus interface subsystem 407. The operation of the BTSI is described in greater detail with reference to FIGS. 2 and 3 in Tables 1 and 2 for the forward link and reverse link data flow operation. In a manner similar to that described with reference with FIG. 4, the ATM cell processor SAR subsystem 405, responsive to the host processor 406 and utilizing address translation memory 404 provides for AAL5 termination and conversely conversion to AAL5 (converting the speech into an AAL5 cell) to permit for utilization of the ATM switch for communication with other subsystems within the AXC. Depending on the direction of data flow, for data flow in, the line framers 401 or 402 provide for delivering and framing of the CDMA data from the external BTSs to the respective circuit interworking unit for a circuit BTS via interface 420 or to a packet interworking unit 404 for external packet base BTS via coupling 421.

For the packet interworking unit 404, operation corresponds to steps 1 to 3 as discussed relative to Table 2, in that the CDMA data is demapped into speech samples, relating an SDU to a VCC, and coupled to the ATM cell processor for conversion to AAL5 protocol for coupling to the cell bus interface for coupling there from to the ATM switch for ultimate coupling to the other elements of the AXC subsystem. Similarly, the operation of the circuit interworking (CktIW) unit 403 is discussed with reference to steps 5 to 7 of Table 2, where the speech samples are extracted from the SCI channel, the speech is mapped into AAL5 cells by the SAR cell processor 405, and coupled to the cell bus interface to the ATM switch for coupling to the other subsystems of the AXC. Conversely, for forward data link processing, the operation of the packet interworking (PktIW) unit 404 corresponds to steps 7 to 9, and the operation circuit interworking unit 403 corresponds to steps 11 to 13. In the forward processing, the data originating from the land unit (PSTN via the MSC via the NI and via the XC), the ATM cell processor SAR at system 405 provides AAL5 termination, in relation to an SCI channel.

The interworking units 403 and 404 provide the respective interworking of the speech sample into an SCI channel for the circuit interworking unit 403 and into an AALCU protocol for packet interworking unit 404. Thereafter, the interworked speech samples are delivered as CDMA data via the respective line framers 401 and 402 via couplings 420 and 421 to the respective circuit or packet BTS spanline and there from to the respective BTS system.

Figure 6:
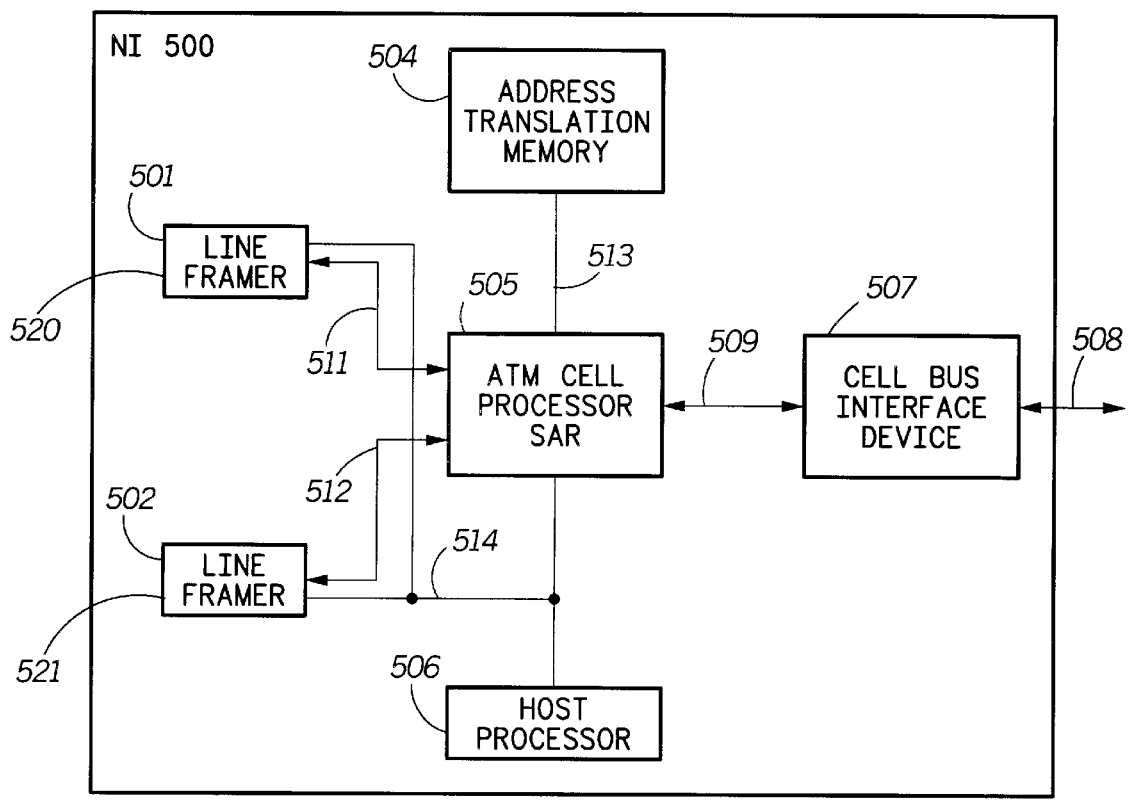
FIG. 6 is an NI functional block diagram, in accordance with the present invention.

Referring to FIG. 6, the network interface functional block diagram is shown for the network interface 500. Communication to the external span lines to the MSC is provided via couplings 520 and 521 to the line framers 501 and 502 respectively and therefrom to the ATM cell processor subsystem interface from the network interface subsystem 500 to the ATM switch is via cell bus interface 507 via coupling 508. ATM format and protocol translation to and from the ATM format and to and from the external A+ format of the MSC is provided via the ATM cell processor SAR subsystem 505 under the control of the host processor 506 in conjunction with utilization of the address translation memory 504. The line framers 501 and 502 provide for line framing and couples via couplings 511 and 512 to the ATM-SAR subsystem 505, and also provides a processor bus interface 514 to couple to that host processor 506.

The SAR subsystem 505 provides for AAL1 cell processing, and couples the processed data to and from the cell bus interface device 507 via coupling 509 utilizing a UTOPIA protocol. Coupling 508 provides a cell bus access to the switching fabric of the ATM switch. Couplings 520 and 521 provides spanline interfaces to the external MSC. The operation of the network interface 500 is also described with reference to FIGS. 2 and 3 and Tables 1 and 2, for the forward direction (FIG. 2 and Table 1) and for the reverse data flow direction (FIG. 3 and Table 2).

Forward link processing of the operation of the network interface is described in steps 1 to 3 of Table 1, while reverse link processing is described in steps 11 to 13 of Table 2. The network interface state flow is illustrated bellow in state flow charts shown in FIGS. 9a, 9b, and 9c, providing for respectively the overall state flow of the network interface, the network interface state flow for PSTN to MS (9b) and the network interface state flow for MS to PSTN (9c).

Figure 7:
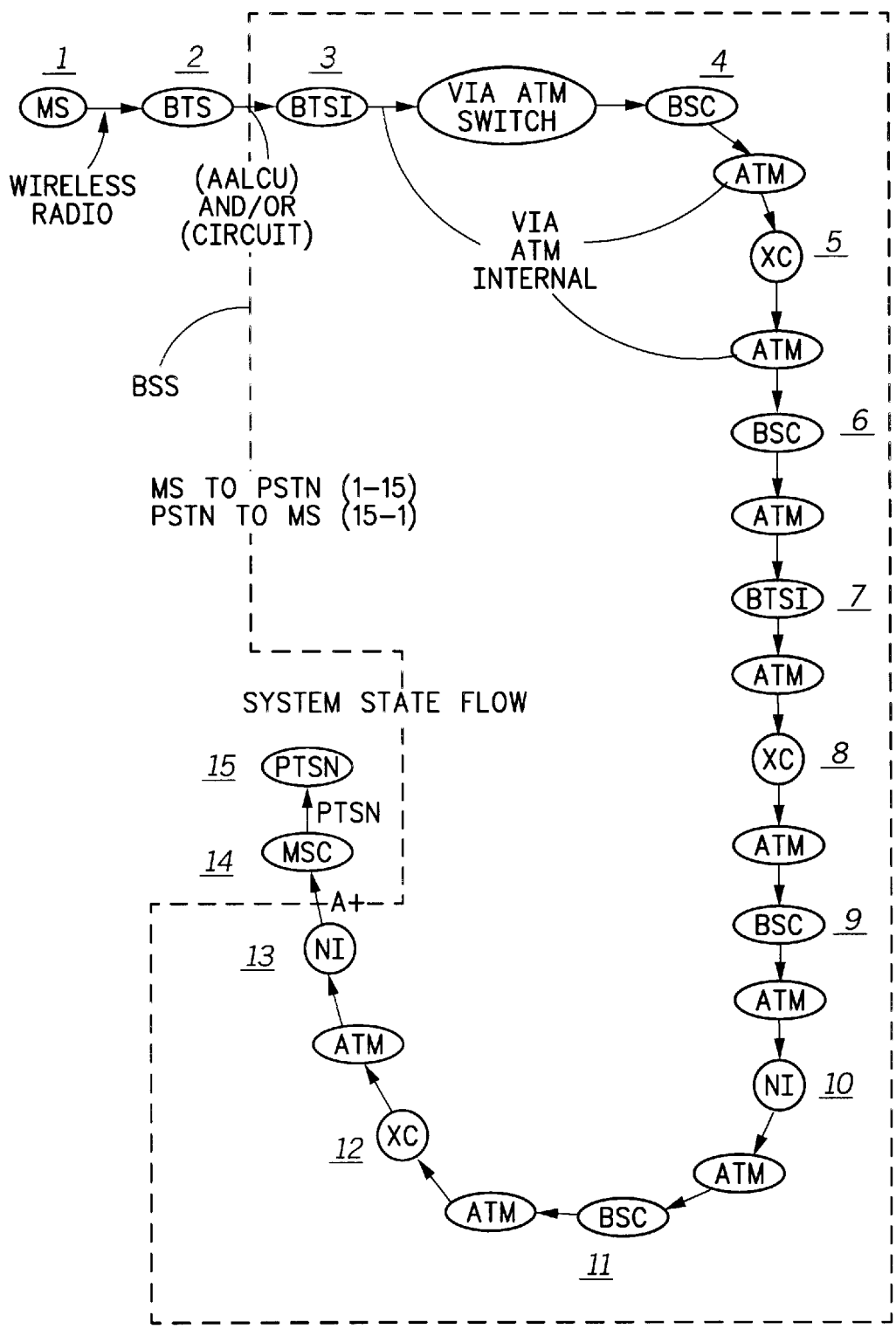
FIG. 7 shows a system state flow diagram, in accordance with the present invention.

Referring to FIG. 7, at step 1, the Mobile Subscriber (MS) initiates a call, in wireless radio communication, being in a defined wireless digital protocol. The BTS 260–263 at step 2, converts between the wireless digital protocol and the AAL-CU or circuit protocol for communication between the BTS 260–263 and a BTSI 253 within the BSS 200. The BSS 200 is shown within the dashed box of the state flow. At step 3, the BTSI 253 responds to the signal from the BTS 260–263 and couples an output in an ATM internal format via the ATM switch 251. The BTSI 253 communicates with the BSC 220 at step 4 which then communicates via the ATM switch 251 to the transcoder 252 at step 5, which notifies the BSC 220 via the ATM switch 251 at step 6 that the transcoder 252 is ready to perform transcoding. The BSC 220 communicates via the ATM switch 251 to notify the BTSI 253 that the transcoder 252 is ready to begin transcoding functions for the BTSI 253 , at step 7. The BTSI 253 then sends the data to be transcoded to the transcoder 252 via the ATM switch 251, at step 8, where the transcoder 252 can perform format conversion both of the voice data digital encoding format from CDMA for the wireless radio to PCM for the PSTN 240, and performs necessary other formatting and conversion functions. The transcoder then outputs information via the ATM switch 251 to the BSC 220 that the transcoder is ready, at step 9. The BSC 220 then notifies the network interface 254 that the transcoder 252 has information ready to be output, via the ATM switch 251, at step 10. The network interface 254 then acknowledges its availability via the ATM switch 251 to the BSC 220, at step 11.

The BSC 220 then notifies the transcoder 252 via the ATM switch 251 that the network interface 254 is ready, at step 12. The transcoder 252 then sends the transcoded data via the ATM switch 251 to the network interface 254, at step 13. At this point, the communicated transport protocol is converted by the network interface 254 from the internal ATM format utilized from steps 3 through step 12, to the mobile switching center 230 compatible protocol format, illustrated as the A+ format, from the network interface 254 directly to the external mobile switching center 230 at step 13. The mobile switching center 230 then couples the data via PSTN trunks 290 to the PSTN 240. Alternatively, the BSS 200 can directly couple from the network interface 254 to the PSTN 240 through a different interface structure 291.

It is to be noted that the state flow from the PSTN 240 to the MS 230 is logically equivalent, with inverse functions and transcoding being performed by the same units, with state flow proceeding from origination of signal from the PSTN at 15 proceeding through steps 14, 13, in descending order down to step 1.

In relation to FIG. 1a, interfacing the ATM Transcoder (AXC) 250 to the Base Transceiver Subsystem interface (BTSI) 253 is a packet-switched (293 FIG. 1a) interface. This cell-based interface allows higher transport capacity, as the CDMA voice packets are variable-rate and thus variable size inherently in the packet-switched BTS interface 253, the overall optimum span capacity for 8 KBPS voice calls can be increased, and the 13 KBPS voice calls could be increased. The AXC 250 therefore interfaces to both types.

The ATM Transcoder subsystem 250 provides, among other functions, an inter-working, transcoding function from/to the BSS 200 and the PSTN 240 via the MSC. The interworking function translates the voice encoding from the IS95 version of the voice encoding. The air interface is more compressed compared to the PSTN pulse code modulation (PCM) voice encoding. The term 'interworking' is conventionally used, and is synonymous with transcoding: the translating or converting from one data format to another. One such example is the air voice decoding and transforming to the type of coding used on the public switch telephone network (pulse code modulation (PCM)). The air interface is more compressed. A typical encoding rate (but not the only) of the interface is 13 kilobits per second. Typical PSTN encoding is 64 kilobits per second for digitized voice.

The subsystems 251, 252, 253 and 254 can be combined into a modular platform such as a backplane that accepts multiple circuit cards to provide fault tolerant computing elements and redundancy, such as use of one or more voice coder ("vocoder") cards, interface termination cards, and a central switch fabric all communicating over a central backplane ("shelves"—not shown) using an ATM format. Multiple different cards can also be provided on a single shelf. The native internal transport is cell based with inter-shelf communication and path connections carried by permanent virtual circuits (PVC) (not shown). The control paths are carried over permanent virtual circuits set up between shelves. The PVCs are established via the OMC-R 210, as a part of the initialization and provisioning of the system. The shelves are interconnected to all the others that it needs to in a mesh. For example, a transcoding shelf would never have to talk to another transcoder shelf. It would have to be able to talk to all BTSI 253 shelves or all MSC-NIC 254 shelves.

The ATM Transcoder Subsystem (AXC) 250 is responsible for the (1) switching function (ATM switch) 251, (2) network interconnectivity with the PSTN 240 via the MSC 230 via the NI 254 and (3) network connectivity with the circuit based BSSs 280 and Base Transceiver Sites (BTS) 260, and transcoding of mobile traffic to/from PCM. The ATM transcoder subsystem 250 provides both a switching function (ATM switch 251) and the network interworking function between the BTS 260 and the MSC 230.

The AXC 250 includes multiple subsystems. The switching function is provided via the ATM switch 251. The network interconnectivity is provided via the NI (1) with the PSTN 240 and (2) with the circuit based BSSs 280 and BTS 260, 261, 262, 263 base sites.

The ATM 251 switching function handles all interconnections in the system. This function may be provided by an ATM switch (e. g. Fore ASX-100) or alternatively by a routing mechanism provided by interface devices (e. g. XC 252, BTSI 253, or NI 254) that does not explicitly require an independent switch function but are interconnected via a shared medium. It handles all the control path switching from any entities of the BSS 200 system. For example, the BSC 220 to any of the XC 252, BTSI 253, or MSC-NICs 254 is handled through the ATM switch 251. The switching function also handles any transport of the voice or data that is originating at the mobile station (MS) 270, 271, or at the MSC 230, going to and from the BSS 200 system. ATM switching is done on a either a virtual channel and/or virtual path basis using permanent virtual and switched virtual circuits. The switch is configured in a mesh. Since permanent virtual circuits are used, connections must exist between every two elements that need to communicate. A mesh means a multiplicity of interconnections are provided within the BSS 200 system.

Each of the BSC 230, BTS 260–263, and ATM transcoder subsystem 250 is a managed subsystem and is coupled to the OMC-R 210 for the O&M functions, such as code download, status, start-up, shut-down, etc. The ATM Transcoder subsystem 250 performs the subsystem management functions as described herein, and is a managed subsystem of the Operations Maintenance Center-Radio subsystem 210.

Figure 8:
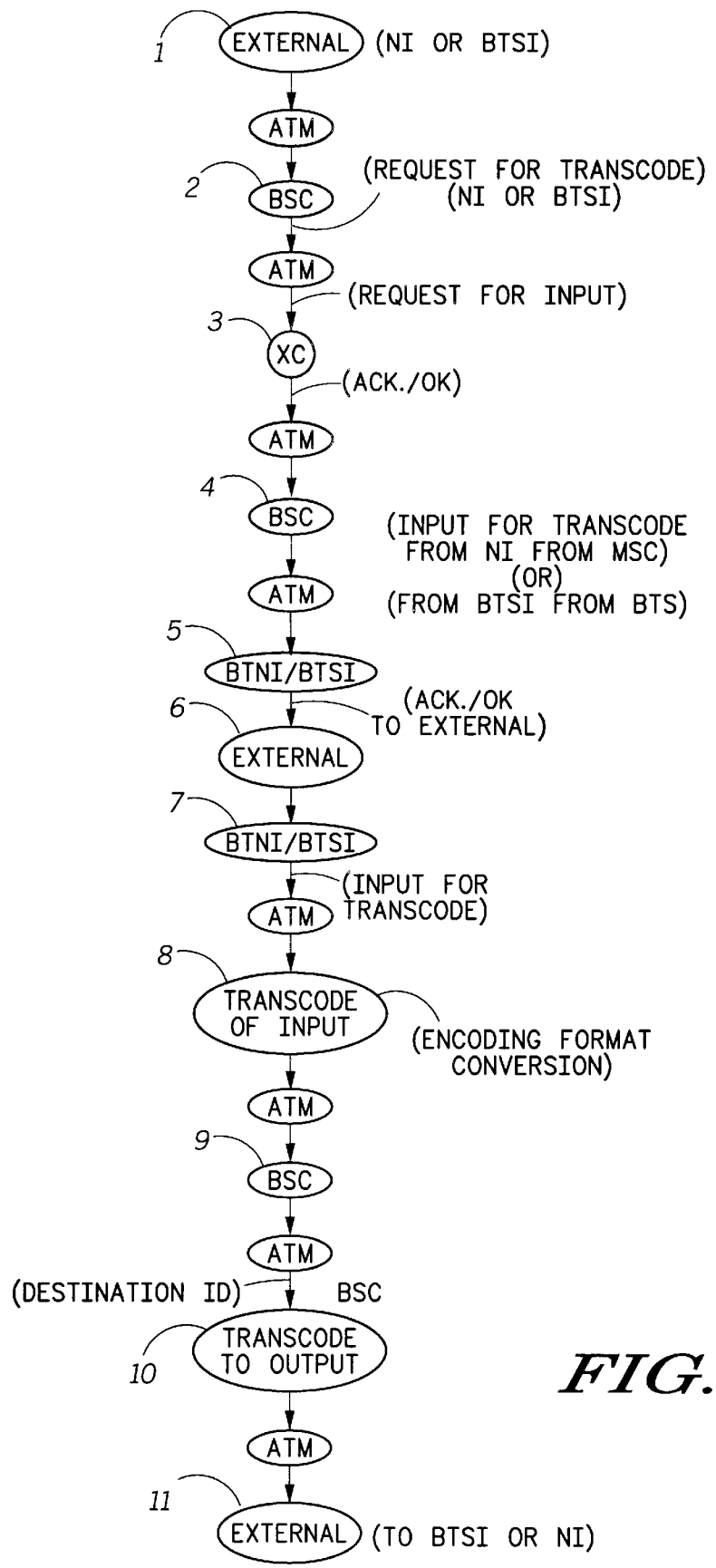
FIG. 8 illustrates the XC state flow, in accordance with the present invention.

Referring to FIG. 8., the state flow for the transcoder 252 of FIG. 1*a* is illustrated. An external source of request for transcoding is provided, such as from the NI 254 or from the BTSI 253, responding to a PSTN 240 request or MS 270, 271 request, respectively. The external request is coupled to the ATM switch 251 to the BSC 220 at step 2, as a request for transcode, and the BSC 220 couples this request for input via the ATM switch 251 to the transcoder 252 at step 3. The transcoder 252 provides an acknowledge signal back to the BSC 220 via the ATM switch 251 at step 4. The BSC 220 then signals the network interface 254 (or the BTSI 253, as the case may be) that the transcoder 252 is ready at step 5. The network interface 254 or BTSI 253 then couples the data from the external requesting source at step 6 via the respective network interface 254 or BTSI 253 at step 7 and then via the ATM switch 251 to the transcoder 252 at step 8 which provides for transcoding and format conversion as appropriate. The transcoder 252 then sends a signal via the ATM switch 251 to the BSC 220 acknowledging its completion of the transcoding at step 9. The BSC 220 then sends a signal via the ATM switch 251 to the transcoder 252 to provide output at step 10, wherein the transcoder XC 252 provides output via the ATM switch 251 to the external other source (e.g., the BTSI 253, or NI 254, respectively, for an original BTSI 253 or NI 254 request), at step 11.

Figure 9A:
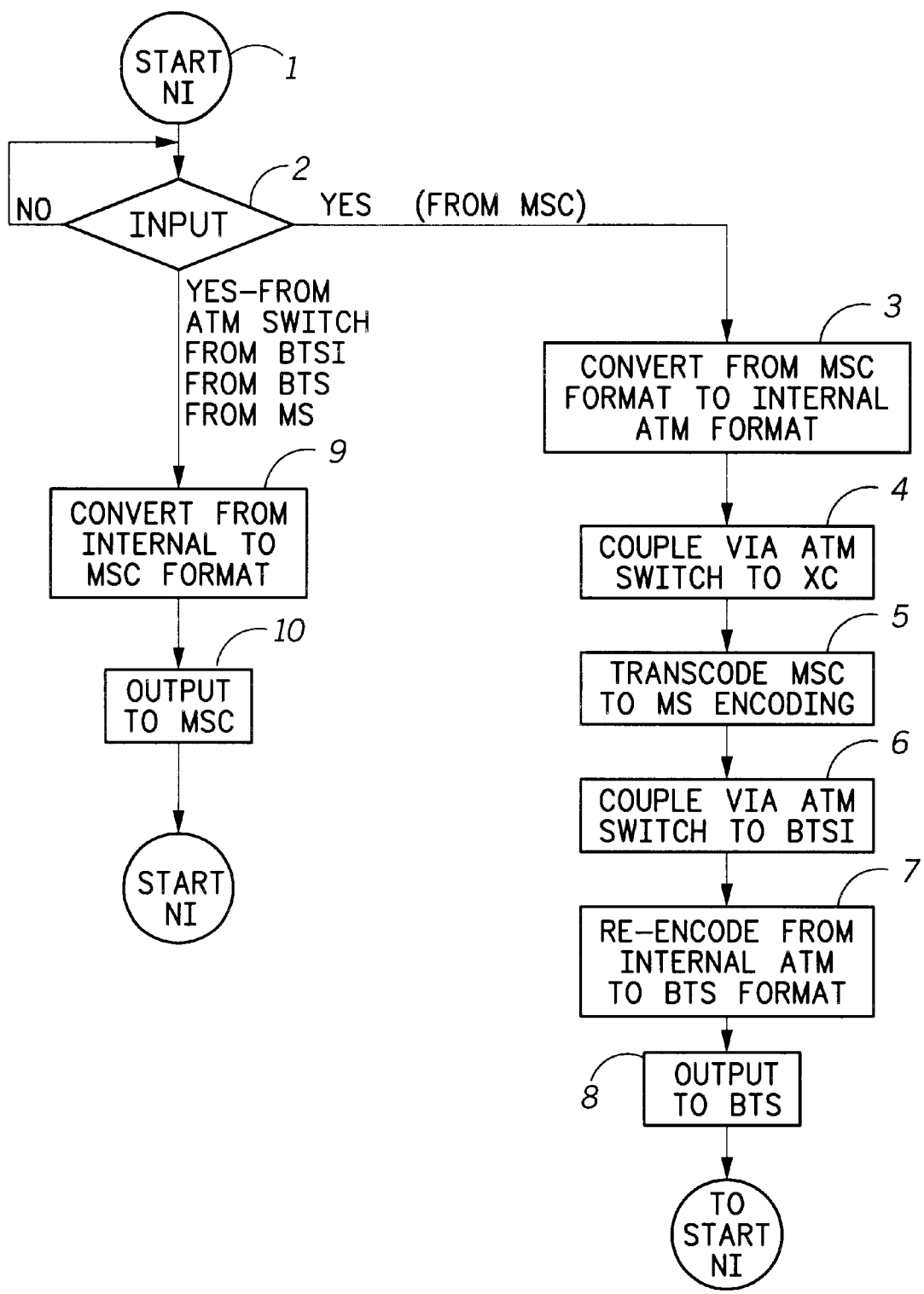
FIG. 9.A shows an NI state flow diagram, in accordance with the present invention.

Referring to FIG. 9A, a state flow chart for the network interface in a generic overview is provided. At step 1, the beginning of the network interface function is activated. If there is an input at step 2, it goes to one of two steps, step 3 or 4, otherwise, if there is no input, it returns back and repeats step 2.

If the input is from the MSC 230, that is, from the PSTN 240, then at step 3, the input is converted from the MSC format to an internal ATM format, and at step 4, coupled via the ATM switch 251 to the transcoder 252, where at step 5, the transcoder 252 transcodes the MSC formatted data to the necessary encoding for MS 270, 271, including conversion of voice encoding and protocols for transport, and at step 6, is coupled via the ATM switch 251 to the BTSI 253 where the re-encoding from the internal ATM format to the BTS compatible format is performed at step 7 and an output is provided to the BTS 260 at step 8, whereafter the network interface 254 returns to step 1 and repeats the process. Alternatively, if the input comes from the mobile subscriber via the 260–263 via the BTSI 253 via the ATM switch 251, then processing proceeds at step 9 where the transcoder converts from the internal ATM format to the MSC format, and couples via the ATM switch 251 to the network interface 254 to provide output to the MSC 230 at step 10, whereafter processing returns to state 1.

Figure 9B:
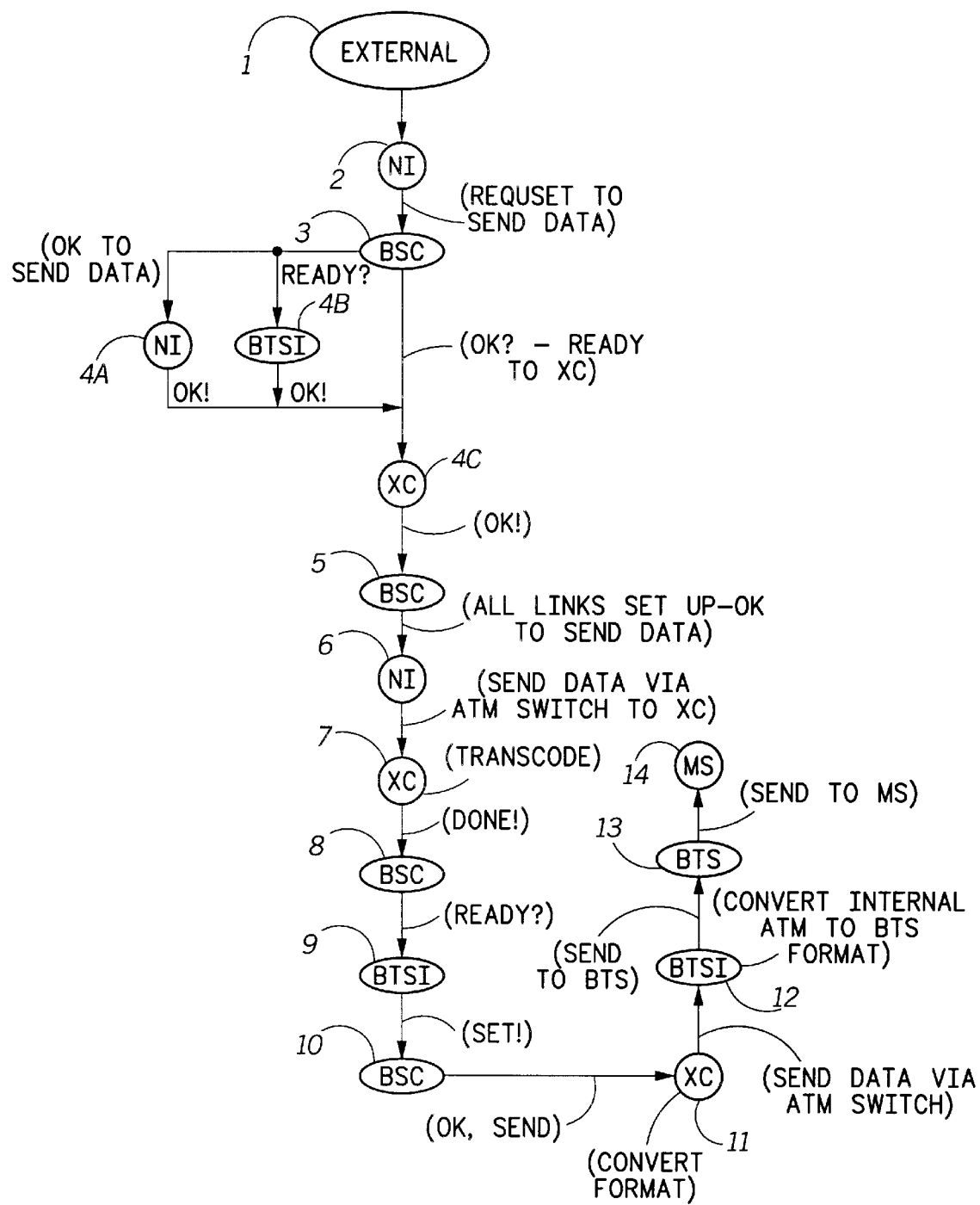

Referring to FIG. 9B., the state flow diagram illustrates the state flow for the network interface 254 for PSTN 240 to MS 270, 271 flow. At step 1, an external signal provides a request to send data to the network interface 254 at step 2. The network interface 254 sends the request to the BSC 220 at step 3. The BSC 220 requests an OK from the transcoder 252 at step 4 to send the data from the network interface 254 for transcoding. The transcoder 252 sends an OK at step 5 to the BSC 220 which it sends an OK to the network interface 254 at step 6 to send the data, wherein the network interface 254 sends the data via the ATM switch 251 to the transcoder 252 . At step 7, the transcoder 252 transcodes the data as appropriate to go from the PSTN to MS formats and transport, and provides a DONE signal to the BSC 220 at step 8 which provides a ready request to the BTSI 253, and at step 9, the BTSI 253 sends a READY ACKNOWLEDGE signal to the BSC 220. At step 10, the BSC 220 forwards an OK TO SEND the data to the transcoder 252. At step 11, the transcoder 252, having performed its format conversion, sends the data via the ATM switch 251 to the BTSI 253, at step 12, wherein the BTSI 253 converts it from the internal ATM format to the appropriate BTS format for communication to the 260–263 at step 13. The BTS 260–263 then converts the BTS format to the wireless digital protocol and sends it the data to the mobile subscriber 270, 271 at steps 13 and 14, wherein the process ends.

Figure 9C:
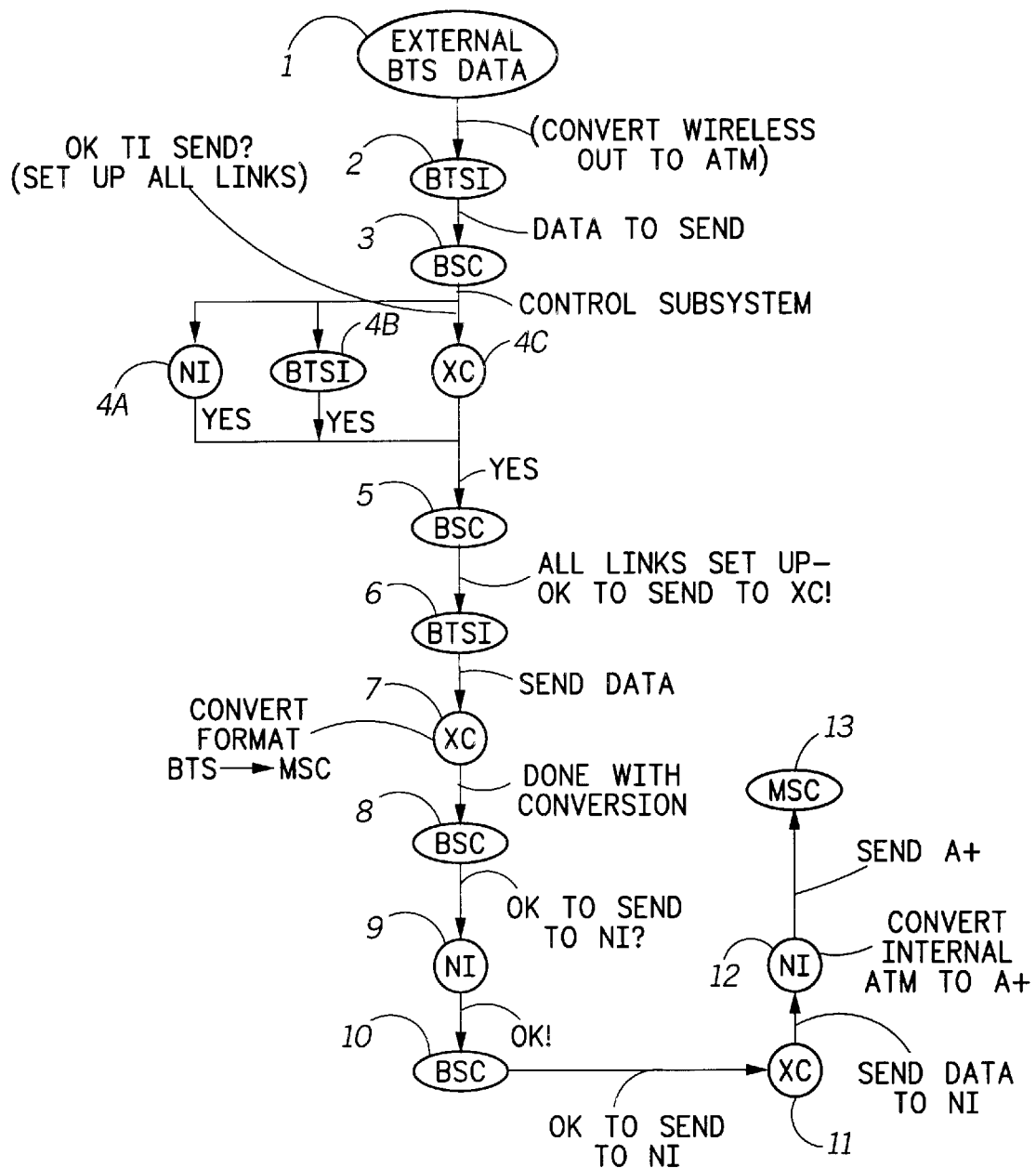

Referring to FIG. 9*c*., there is illustrated the network interface state flow for the mobile subscriber to PSTN connectivity. At step 1, the external BTS data request is coupled to the BTSI 253 at step 2, wherein the BTSI 253 converts from the wireless digital protocol to an internal ATM format, and sends a request to send data to the BSC 220 at step 3, which requests OK from the transcoder 252, which at step 4 sends an OK to the BSC 220. At step 5, the BSC 220 sends an OK to the BTSI 253 to send the converted data to the transcoder 252 which performs transcoding of the format from the BTS to the network interface (PSTN) format, and when complete, sends a COMPLETE signal to the BSC 220, which at step 8, sends a request to send data from the transcoder 252 to the network interface 254. At step 9, the network interface 254 sends an OK to the BSC 220 to have the transcoder 252 send the transcoded data to the network interface 254 for output therefrom. At step 11, the transcoder 252 sends the data to the network interface. At step 12, the network interface 252 performs conversion from the internal ATM to the external transport protocol, illustrated as the A+ protocol, and sends the A+ formatted data to the MSC 230 at step 13, wherein the process ends. It should be understood by one of ordinary skill in the art, that the BSC does not explicitly approve each cell transfer individually, but simply establishes the paths among the appropriate devices, whereafter the cells flow between these devices without further action by the BSC.

Figure 10:
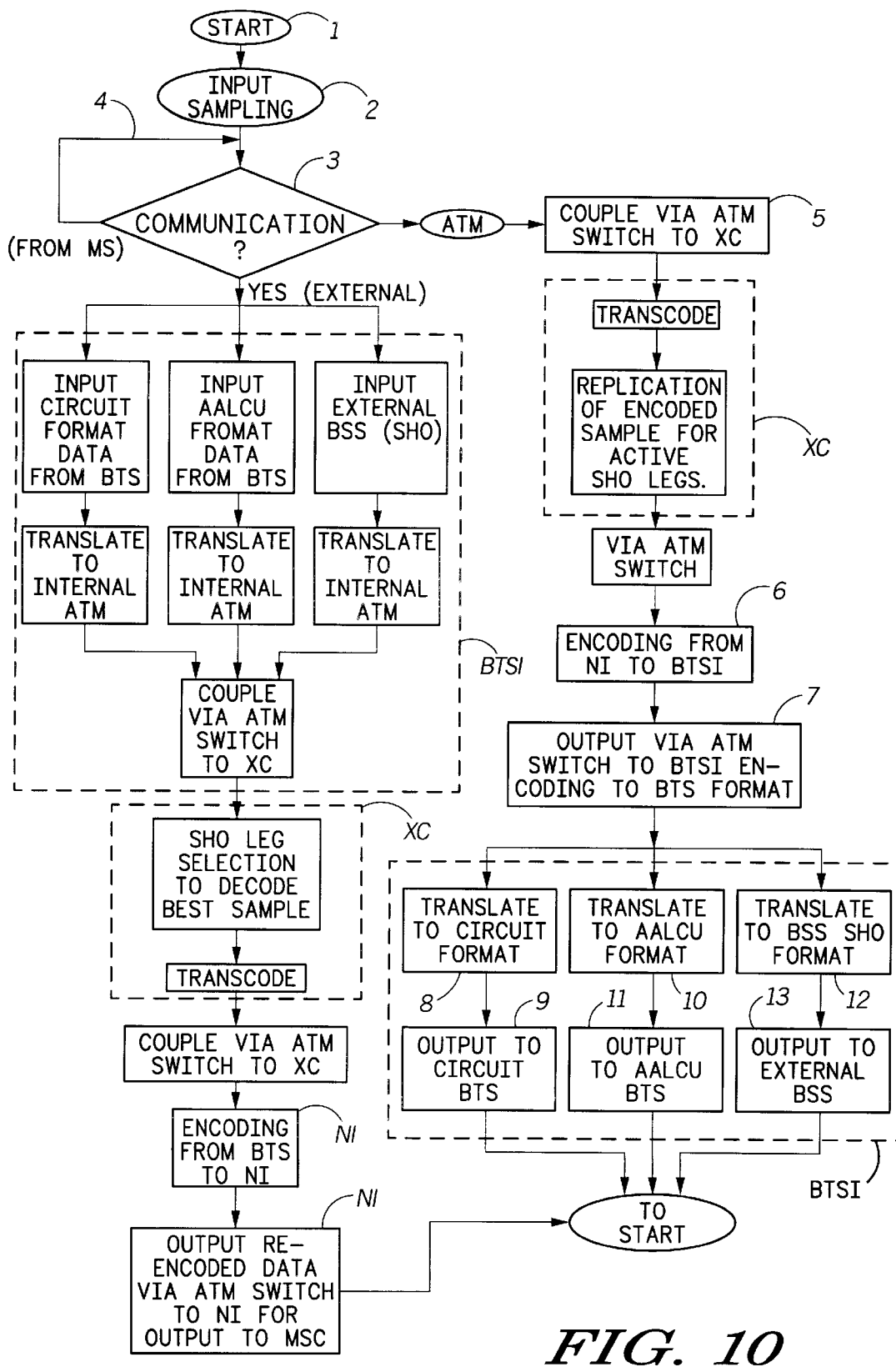
FIG. 10 shows the soft handoff process of the system, in accordance with the present invention.

Referring to FIG. 10, the state flow for communication utilizing the AXC 250 is illustrated. Referring to FIG. 10, the soft hand-off operation of the system is illustrated. Beginning at step 1, input sampling is begun at step 2, and it is tested to see whether there is any communication input at step 3. If there is no input, then at step 4 the process repeats back to step 3.

Otherwise, if there is input ultimately from the PSTN 240, via the network interface 254, then processing proceeds with input via the network interface via the transcoder 252, where processing begins by the network interface 254 through the ATM switch 251 coupling to the transcoder 252 at step 5, and then the transcoder encoding from the network interface 254 to the BTSI protocol at step 6, wherein the output is coupled via the ATM switch 251 to the BTSI 253 for encoding to BTS format, at step 7. At that point, the BTSI 253 can perform one of three functions, including conversion to the circuit format at step 8, and from there output to the circuit BTS at step 9, whereafter it returns to the start of step 1. Alternatively, the BTS 220 can translate to the AAL-CU format and output this AAI-CU at step 10 and output this AAL-CU in BTS format at step 11 to the BTS 260–263, thereafter returning to step 1. Alternatively, the BTS 260–263, or the network interface 254, can provide for translation to the BSS 200 soft hand-off format, at step 12, which provides for operation of mobility management and tracking of mobile subscribers 270, 271. Also shown optionally in FIG. 1a, the coupling from BSS to BSS can be via the ATM switch 251 and an ATM link supported by the BTSI 253. The output is provided to the external BSS 600 at step 13 to effectuate soft hand-off and duplication as necessary, whereafter processing returns to step 1.

Figure 11:
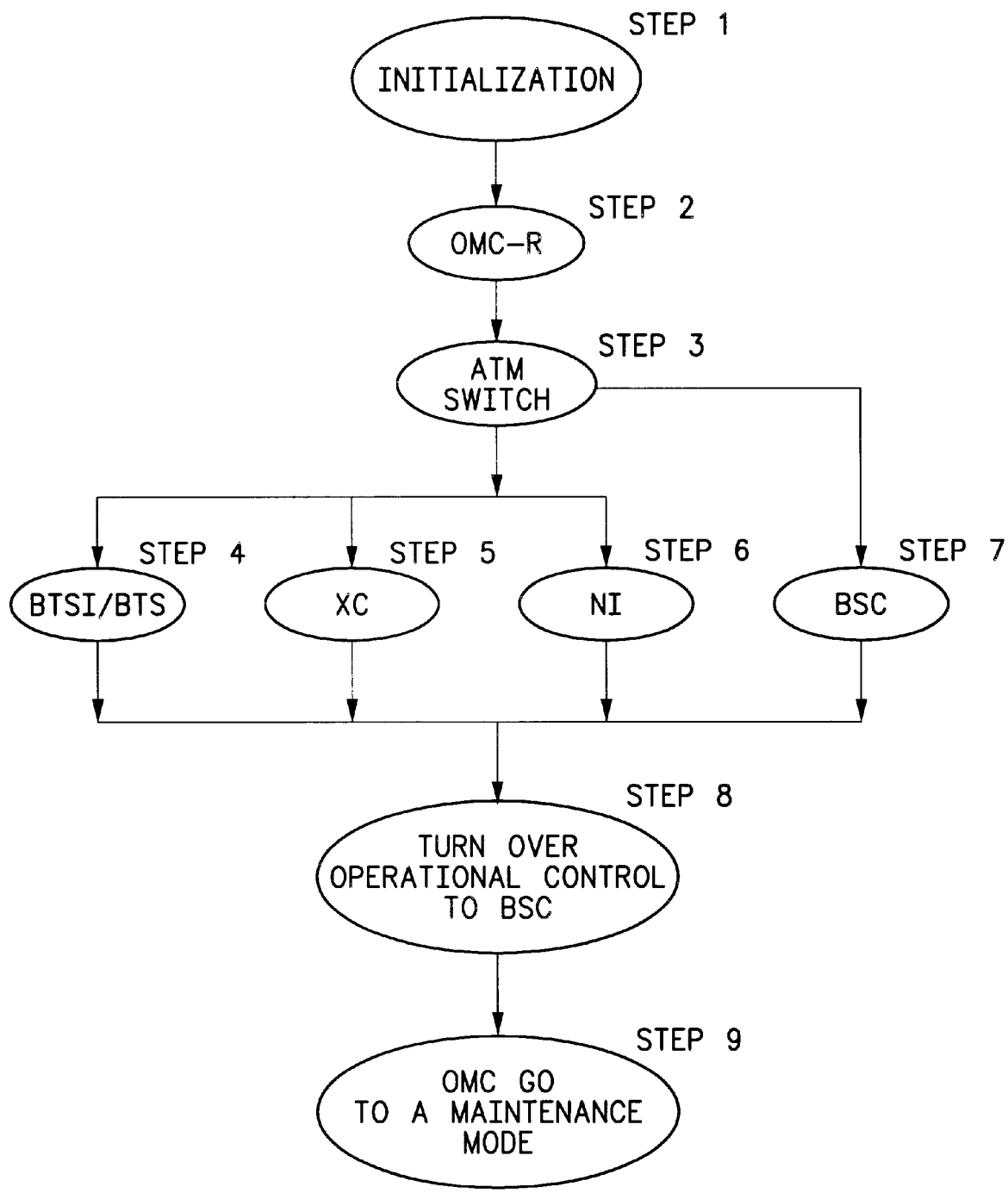
FIG. 11 illustrates the OMC-R initialization flow, in accordance with the present invention.

Referring to FIG. 11, and with reference to FIG. 1a, in an initialization mode, the OMC-R 210 communicates via the ATM switch 251 to the BSC 220 to initialize it, and also communicates via the ATM switch to initialize each of the transcoder 252, the BTSI 253, and the network interface 254. Following initialization at step 1, the OMC-R 210 begins processing at step 2, and the OMC-R 210 couples, via the ATM switch 251, to each of the BSC 220, XC 252, BTSI 253, BTS 260–263 (via BTSI), and NI 254, providing for initialization of each device, including initialization of data tables and registers therein, and thereafter turns over operational control of the BSS system 200 to the BSC 220. At step 3, the ATM Switch 251 is initialized in order to allow the OMC-R 210 to communicate with the other BSS elements. The remainder of the AXC 250 is initialized, including the BTSI 253, XC 252, and NI 254, which are initialized in steps 4, 5, and 6, respectively. The BSC 220 is initialized in step 7. The BTS 260–263 may be initialized subject to successful initialization of the BTSI 253. At step 8, operational control is turned over to the BSC 220 from the OMC-R 210. At step 9, the OMC-R 210 goes into a maintenance mode and continues to monitor and maintain maintenance control. The order in which the initialization of the BSC, XC, BTSI, and NI occurs is not critical, and they can occur sequentially or concurrently, also at the designer's option. At the conclusion of the initialization of the subsystems 252, 253, and 254 of the AXC 250 and of the BSC 220, and BTSs 260–263, the OMC-R 210 turns over control to the BSC 220 which thereafter controls the operational aspects of the AXC and provides for call management and mobility management, and other functionality and services. The OMC-R 210 then goes to a maintenance and control mode, as described in FIG. 12.

Figure 12:
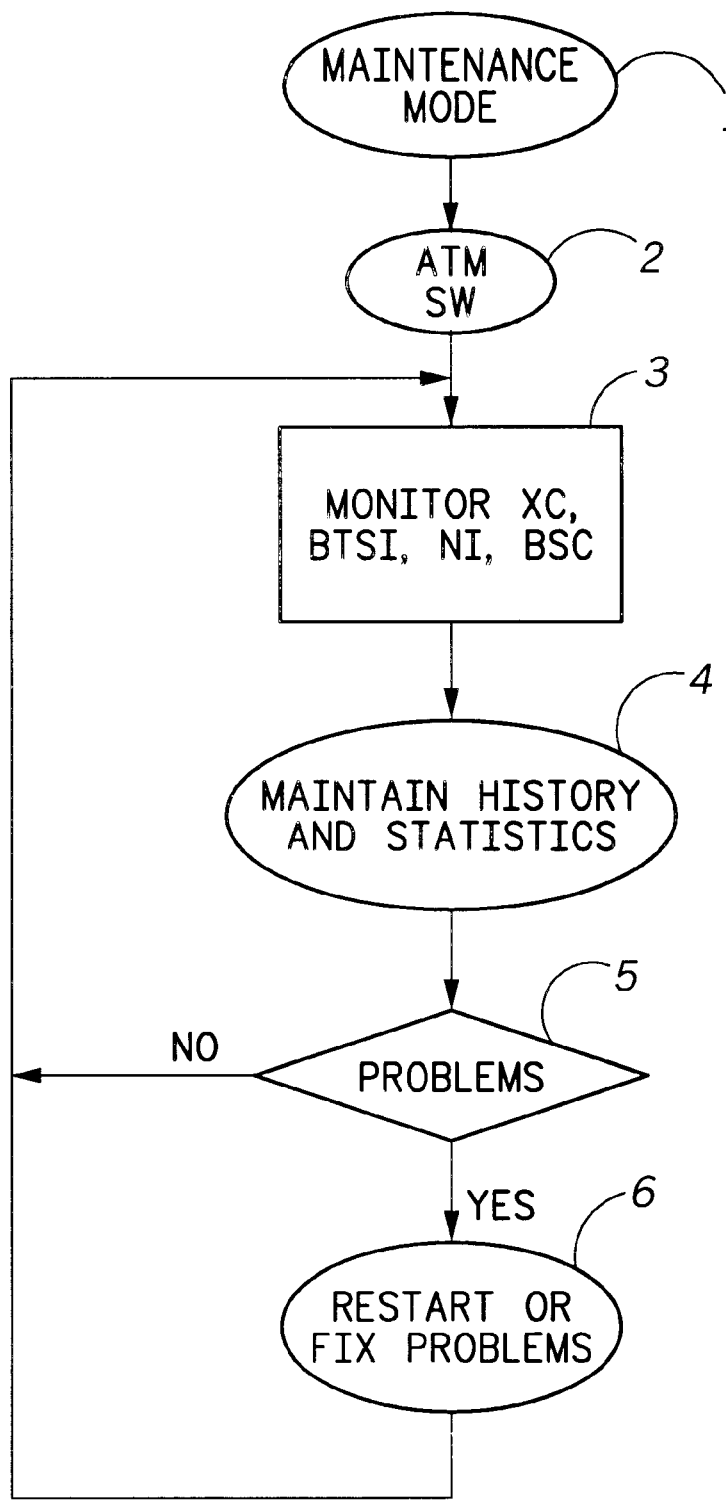
FIG. 12 shows the maintenance mode operational flow for the OMC-R, in accordance with the present invention.
Figure 13A:
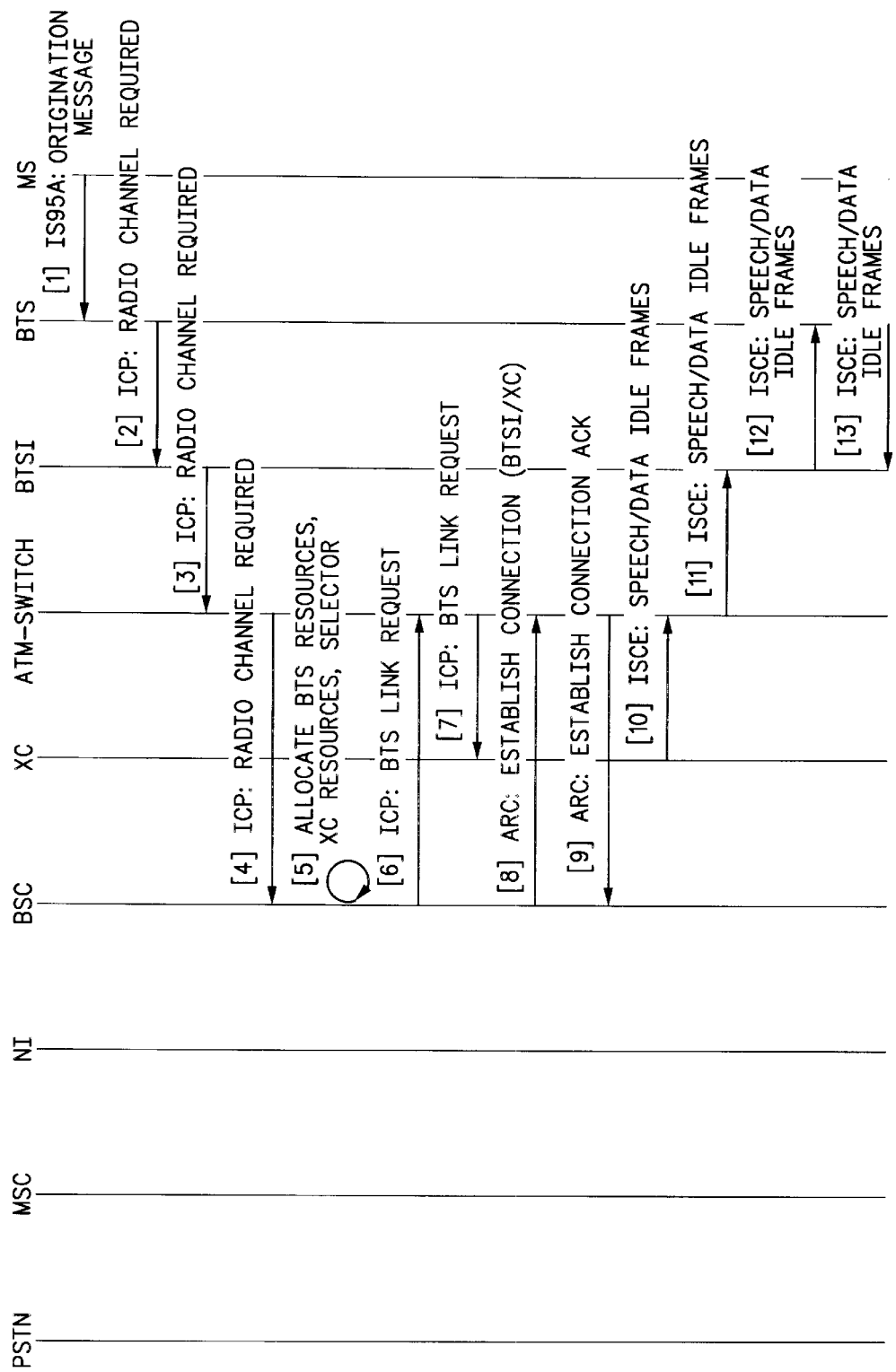
FIGS. 13(a–f) are ladder diagrams showing the CDMA mobile subscriber origination process, in accordance with the present invention.
Figure 13B:
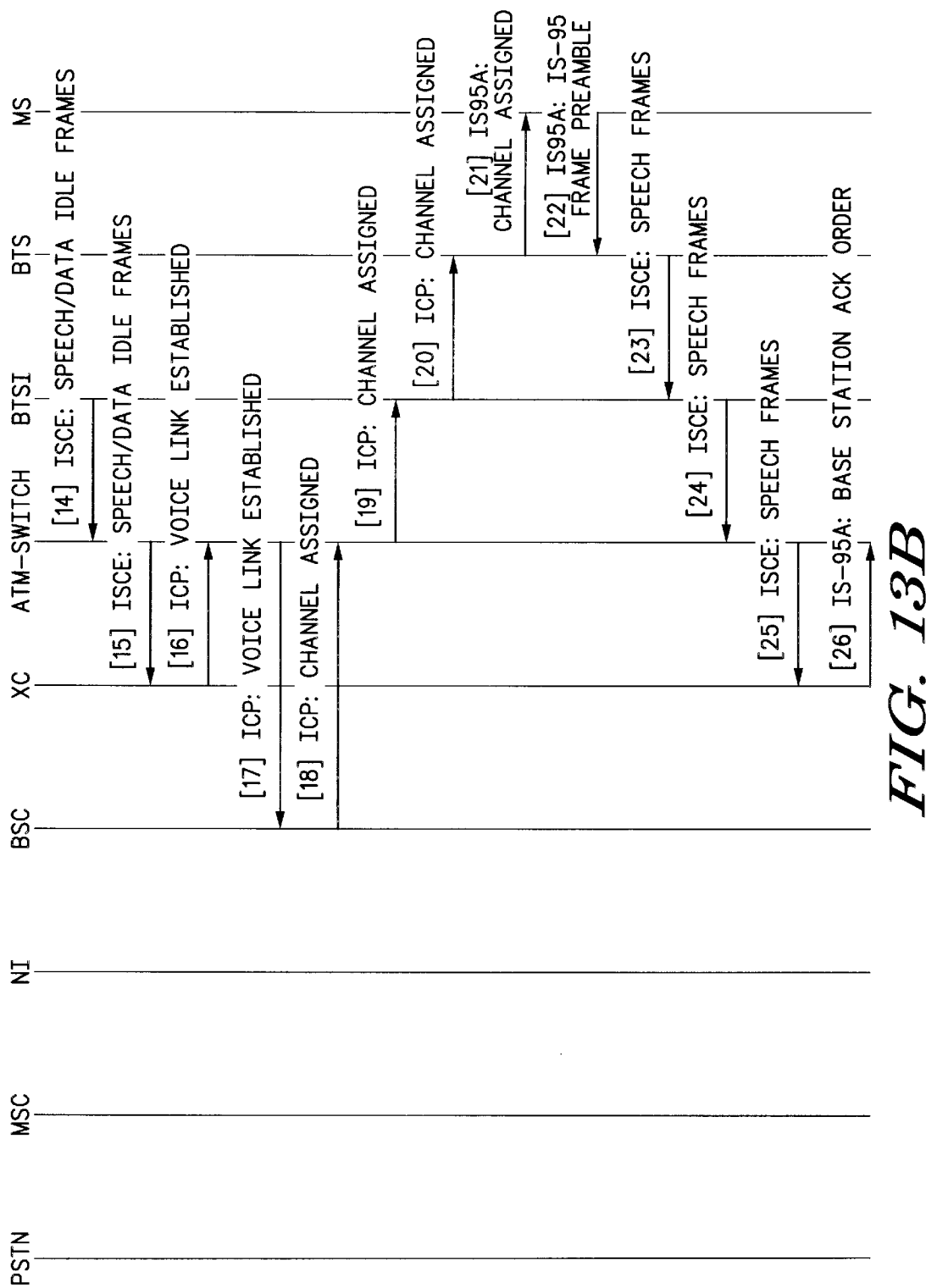
Figure 13C:
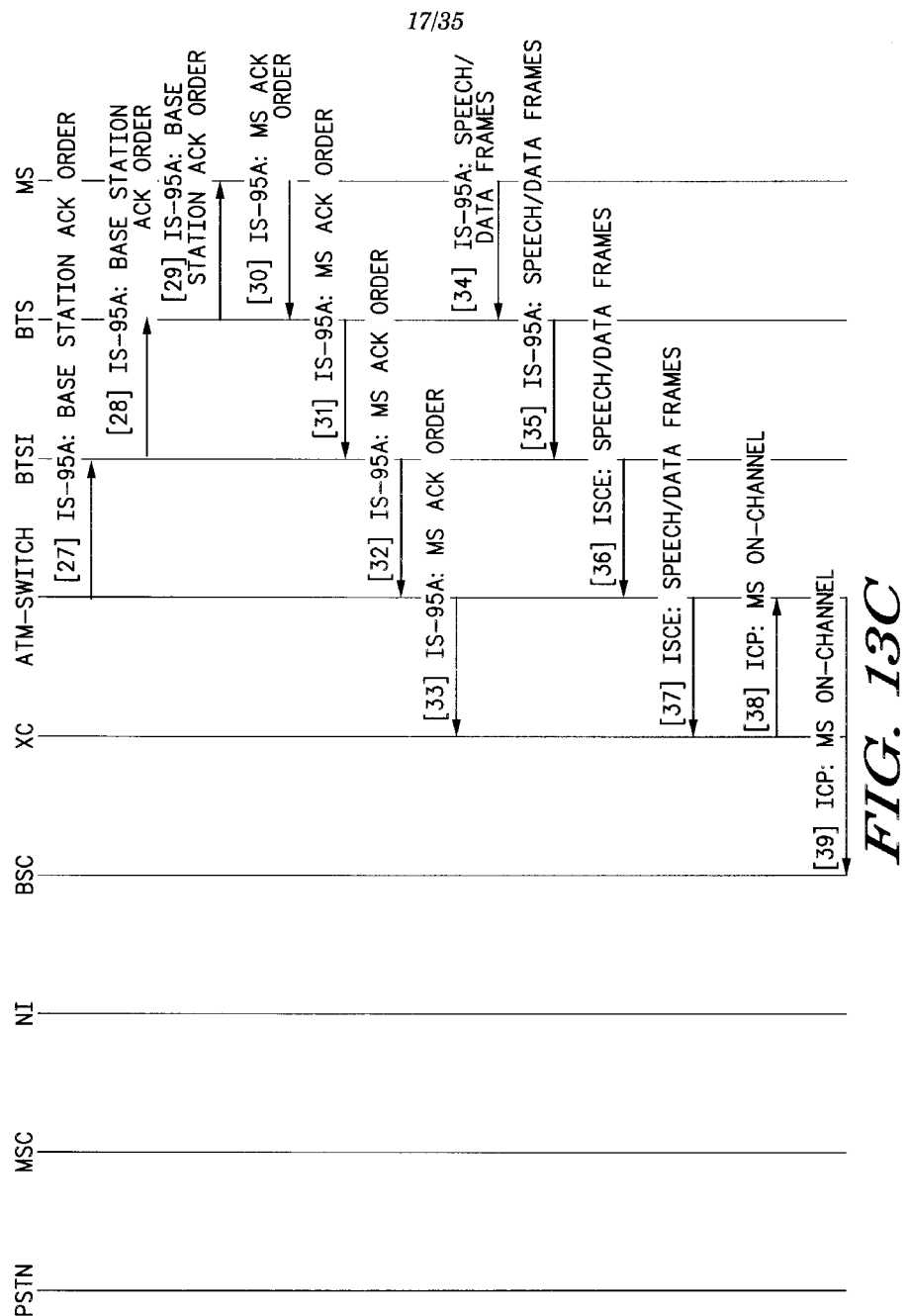
Figure 13D:
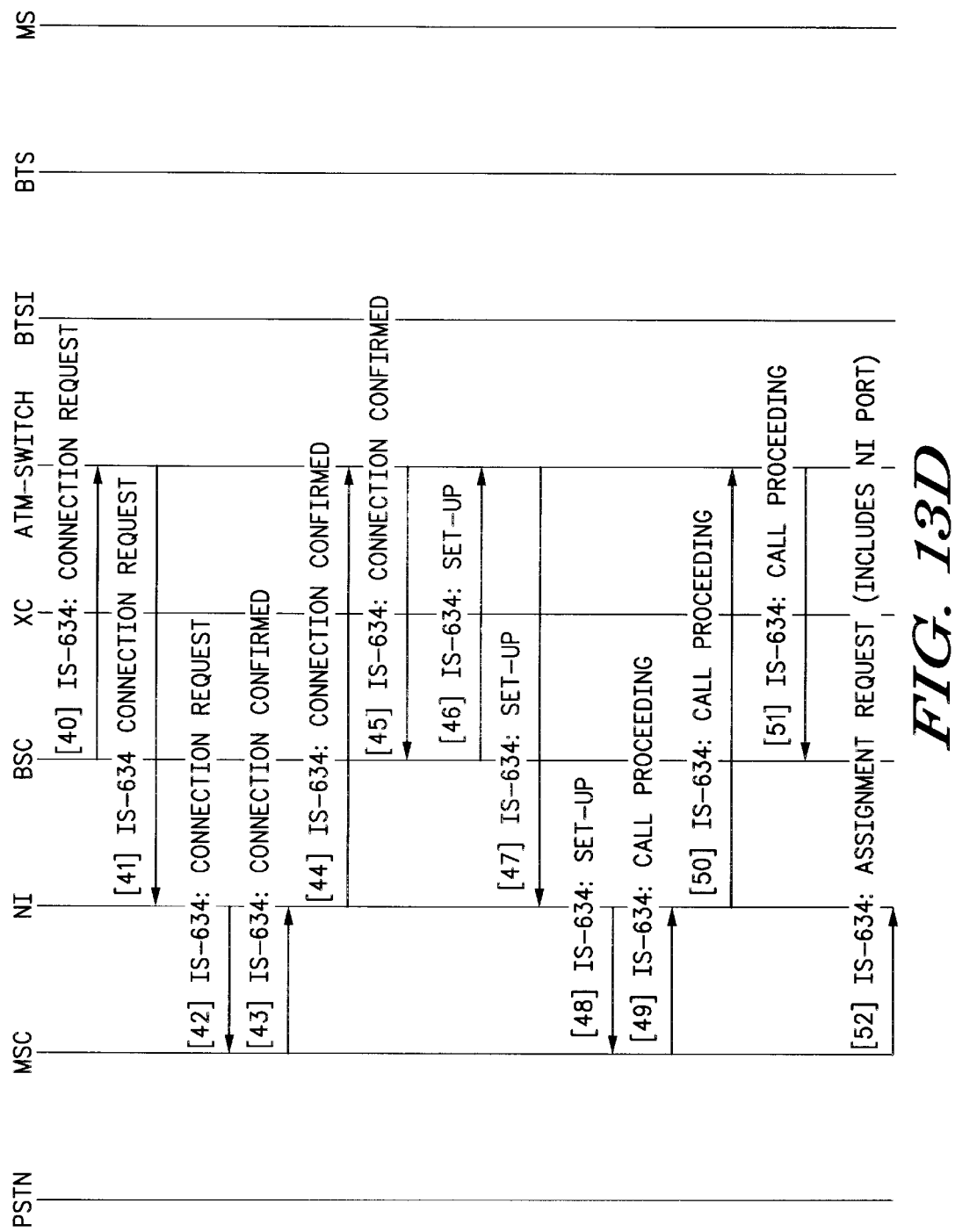
Figure 13E:
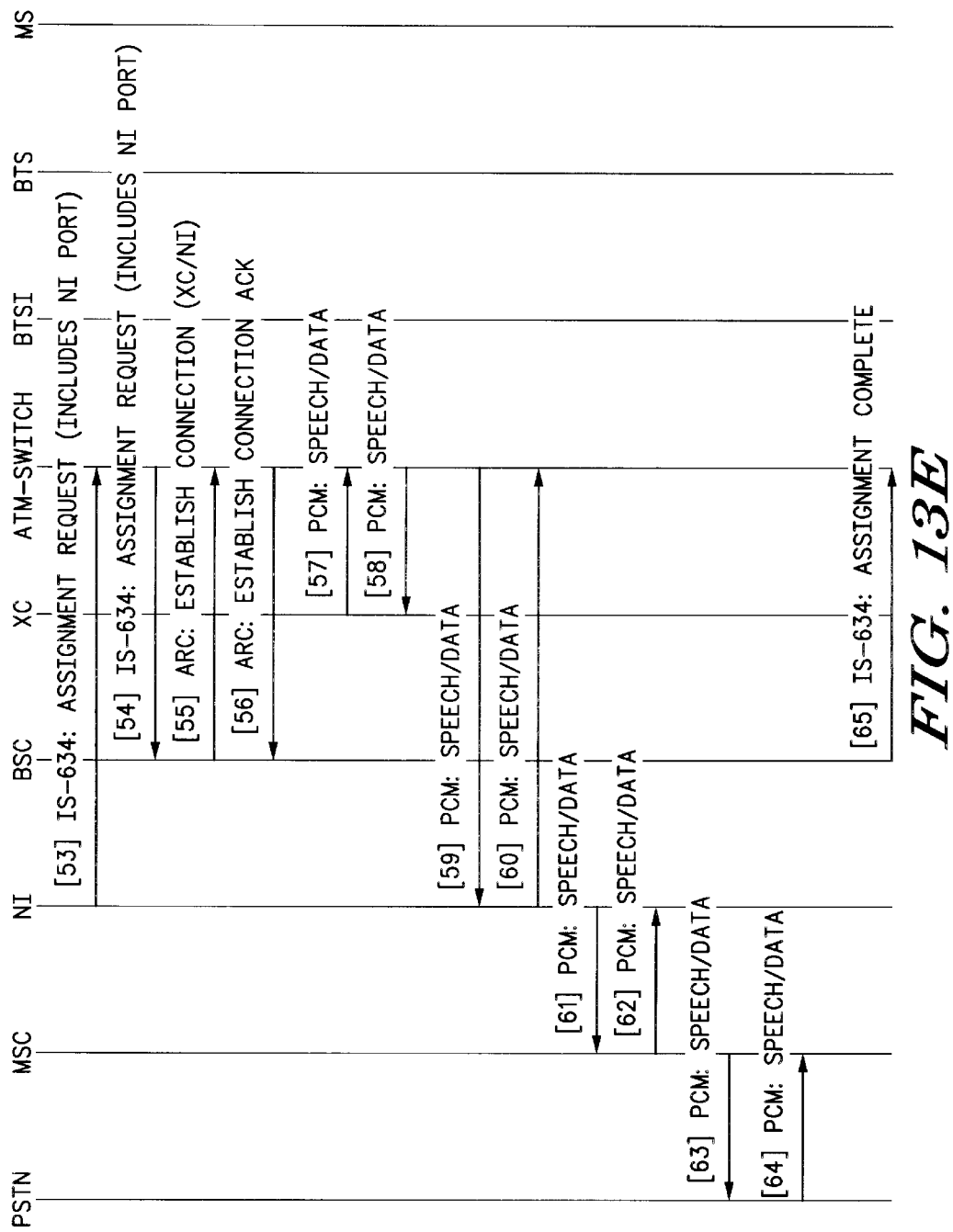
Figure 13F:
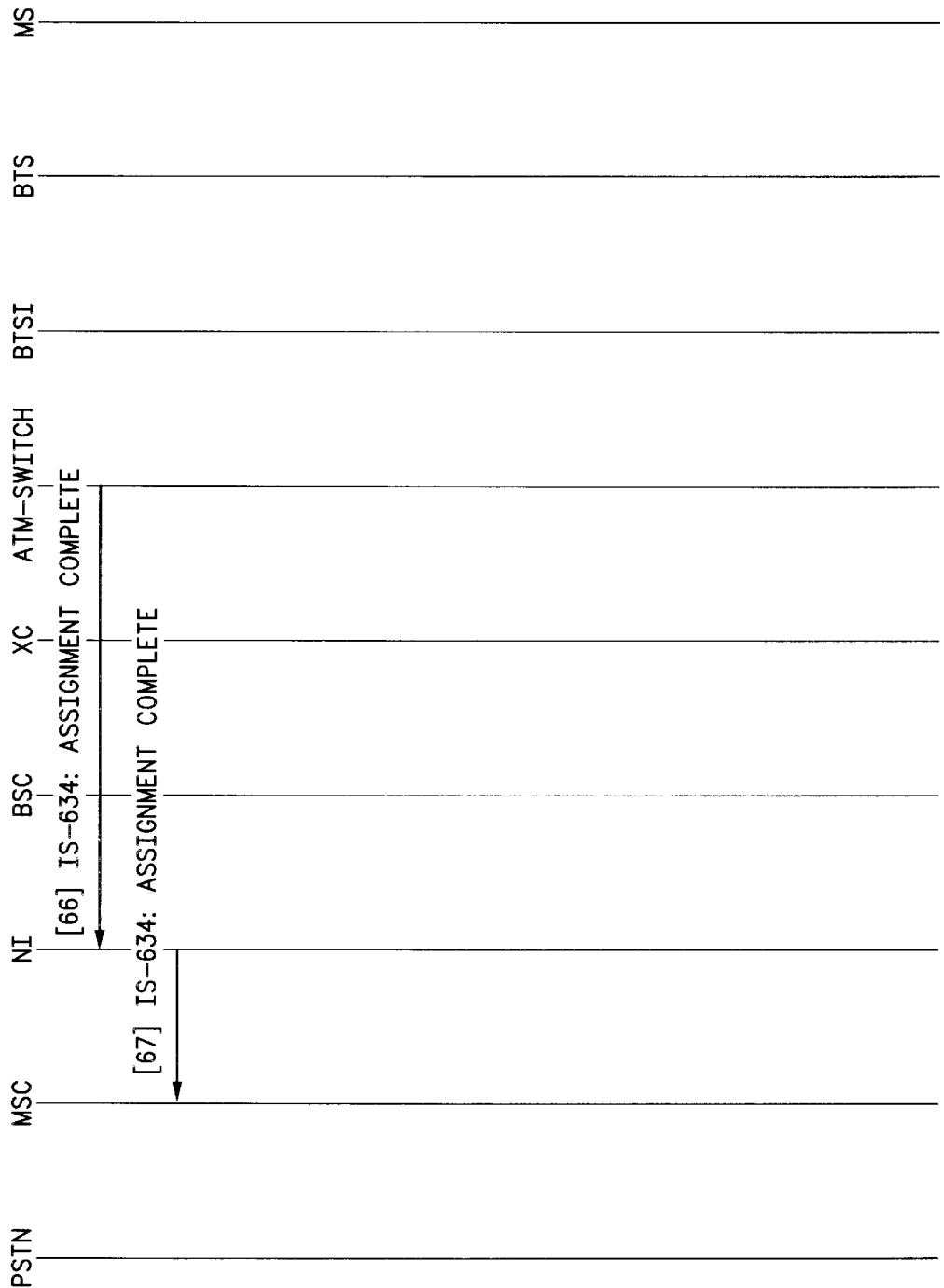
Figure 14A:
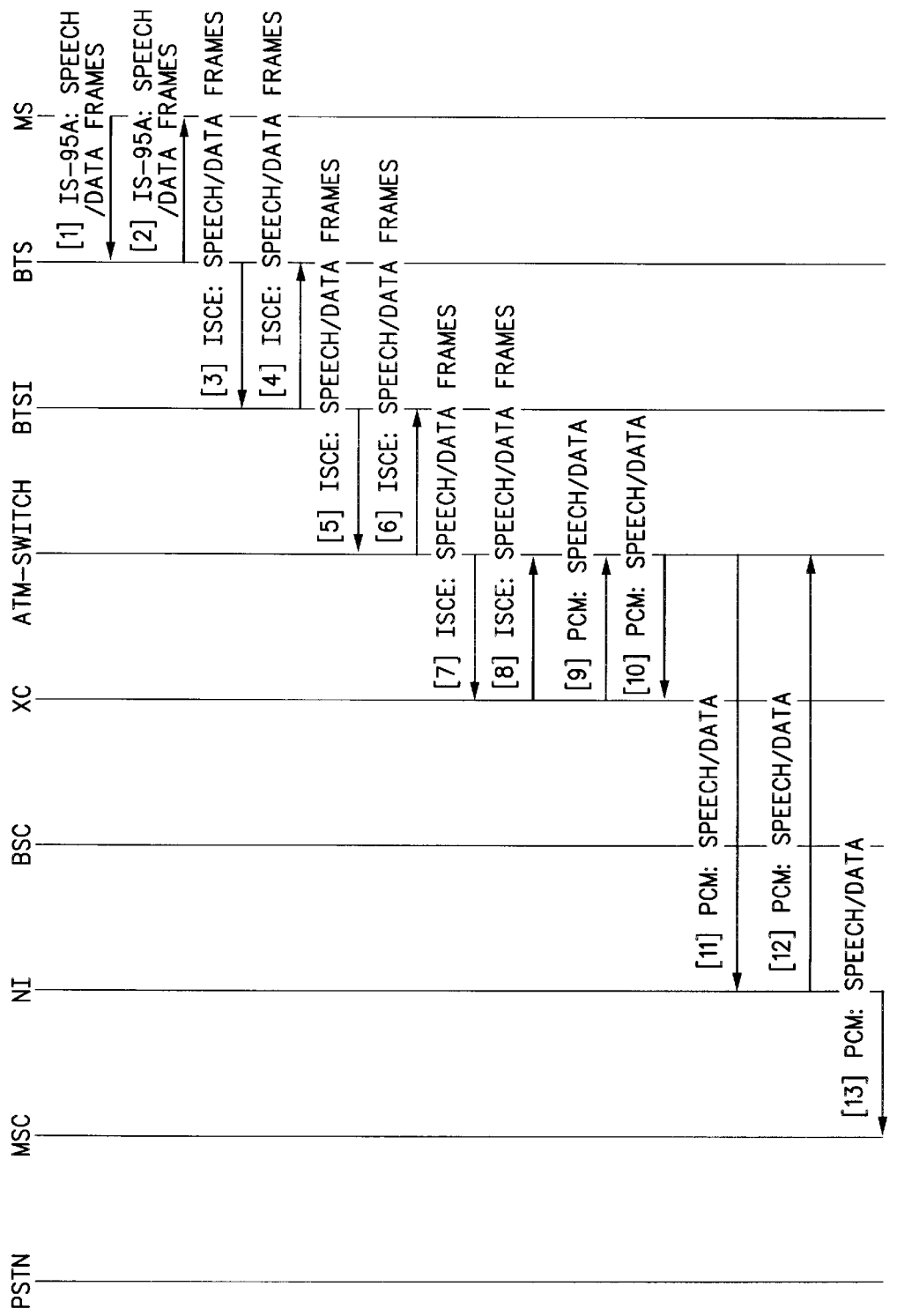
FIGS. 14(a–f) show the CDMA mobile subscriber initiated release process, in accordance with the present invention.
Figure 14B:
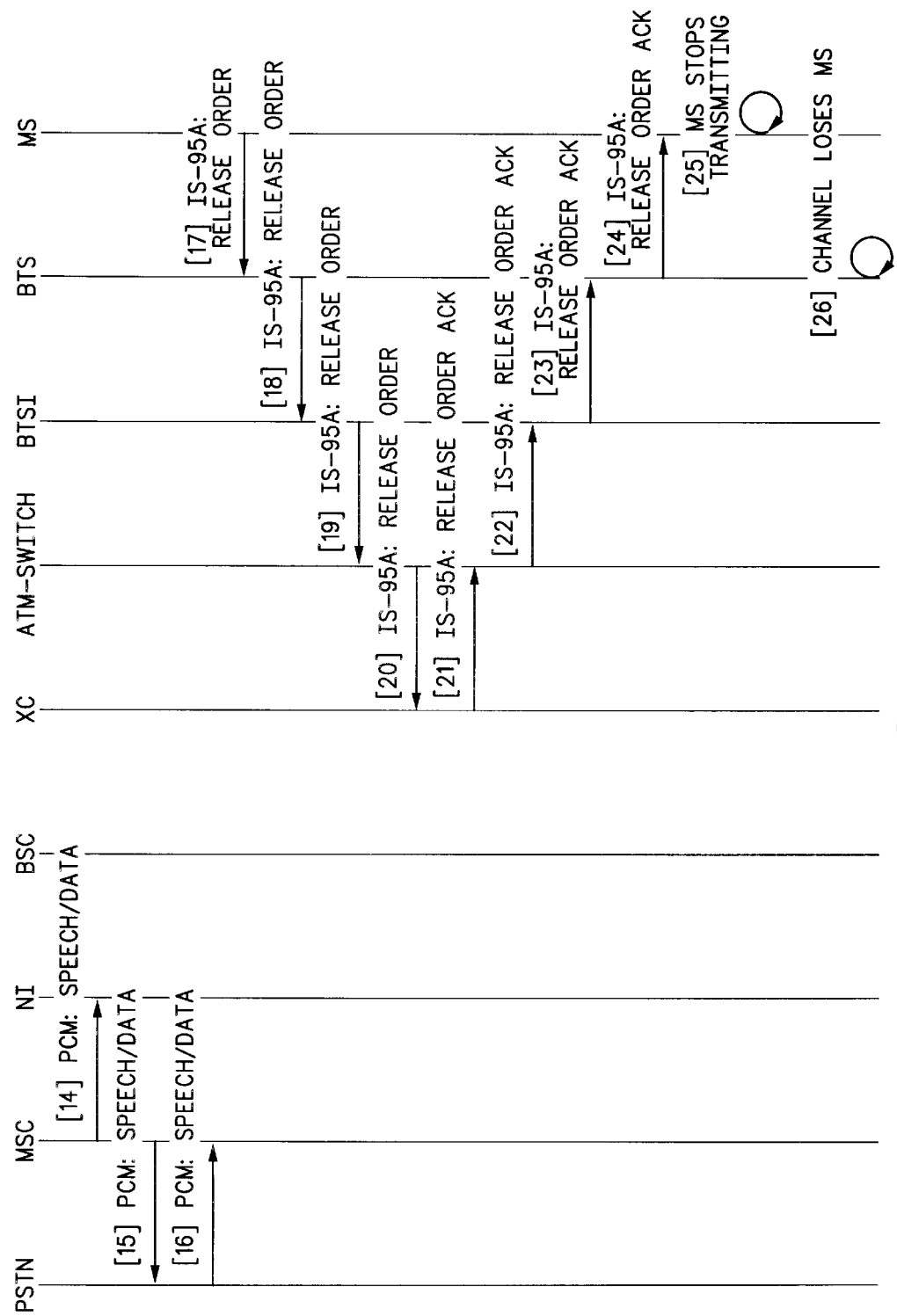
Figure 14C:
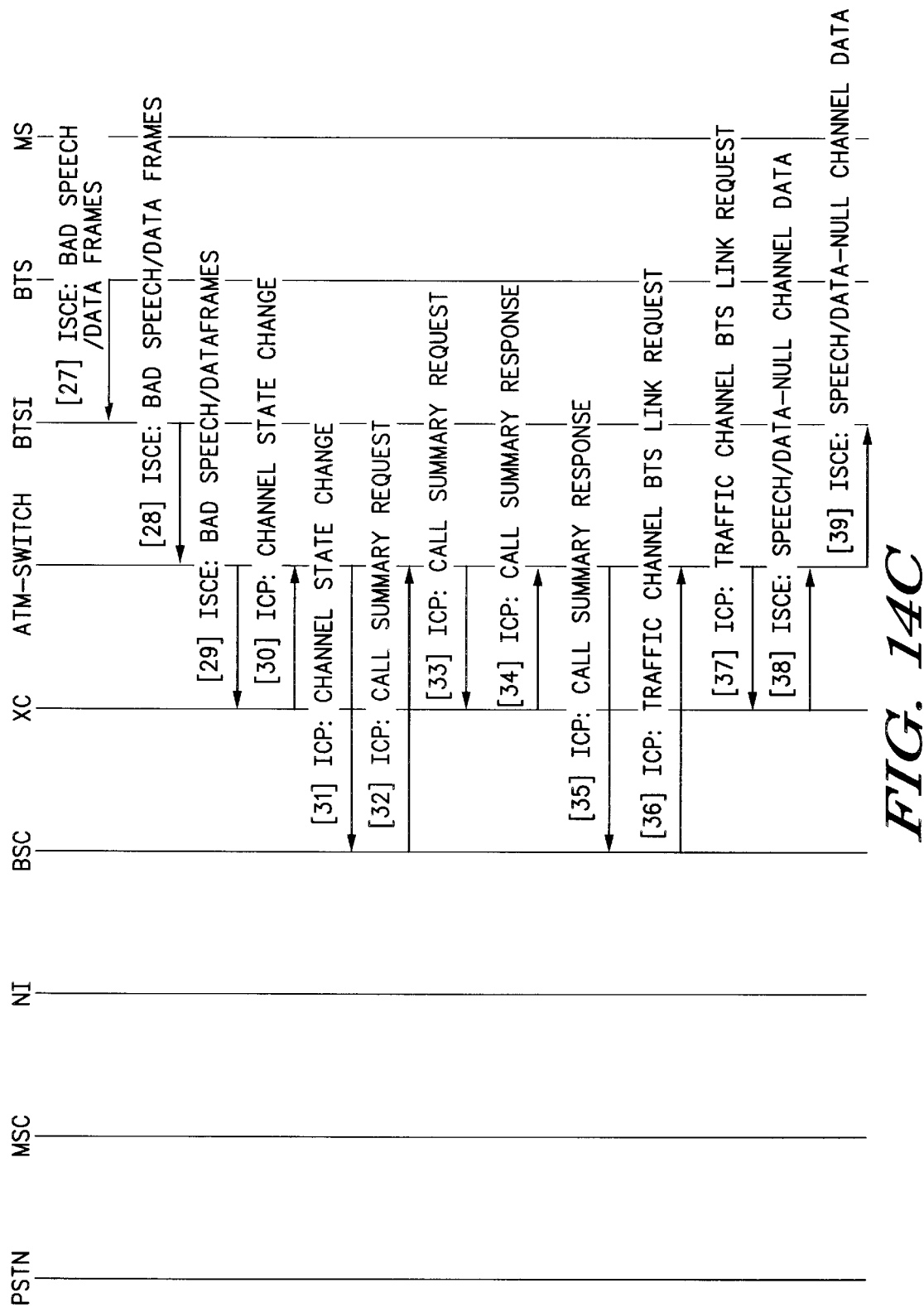
Figure 14D:
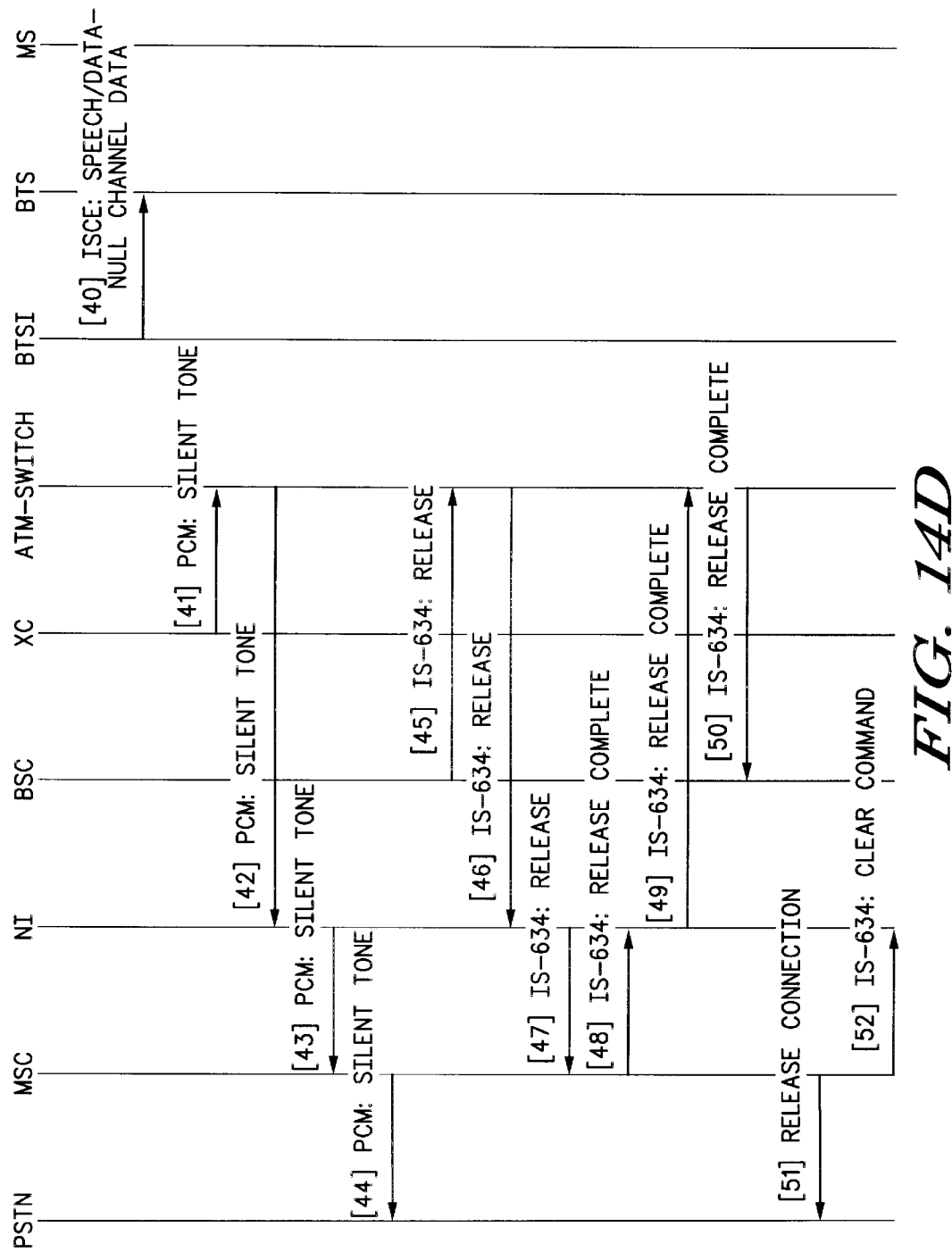
Figure 14E:
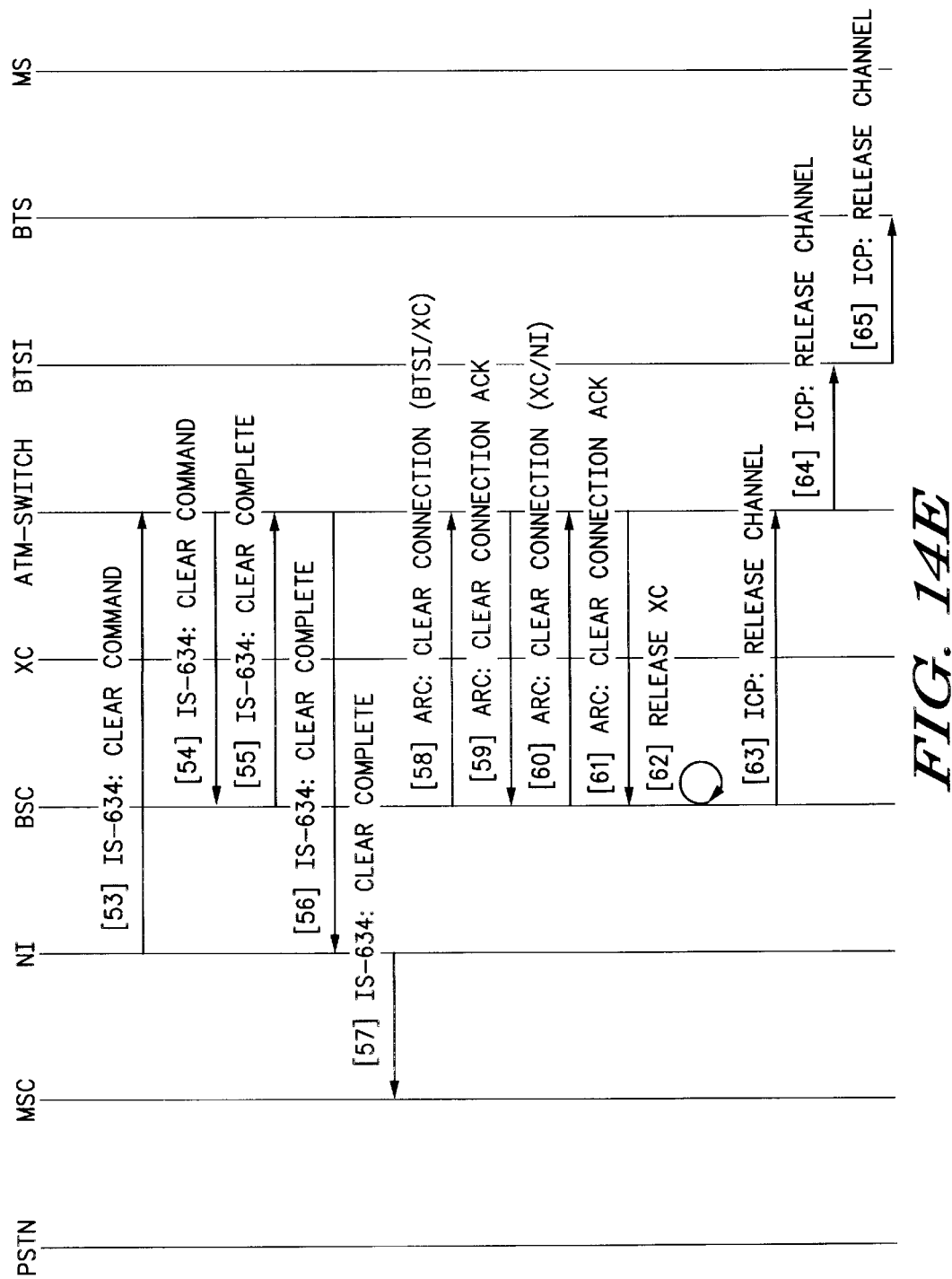
Figure 14F:
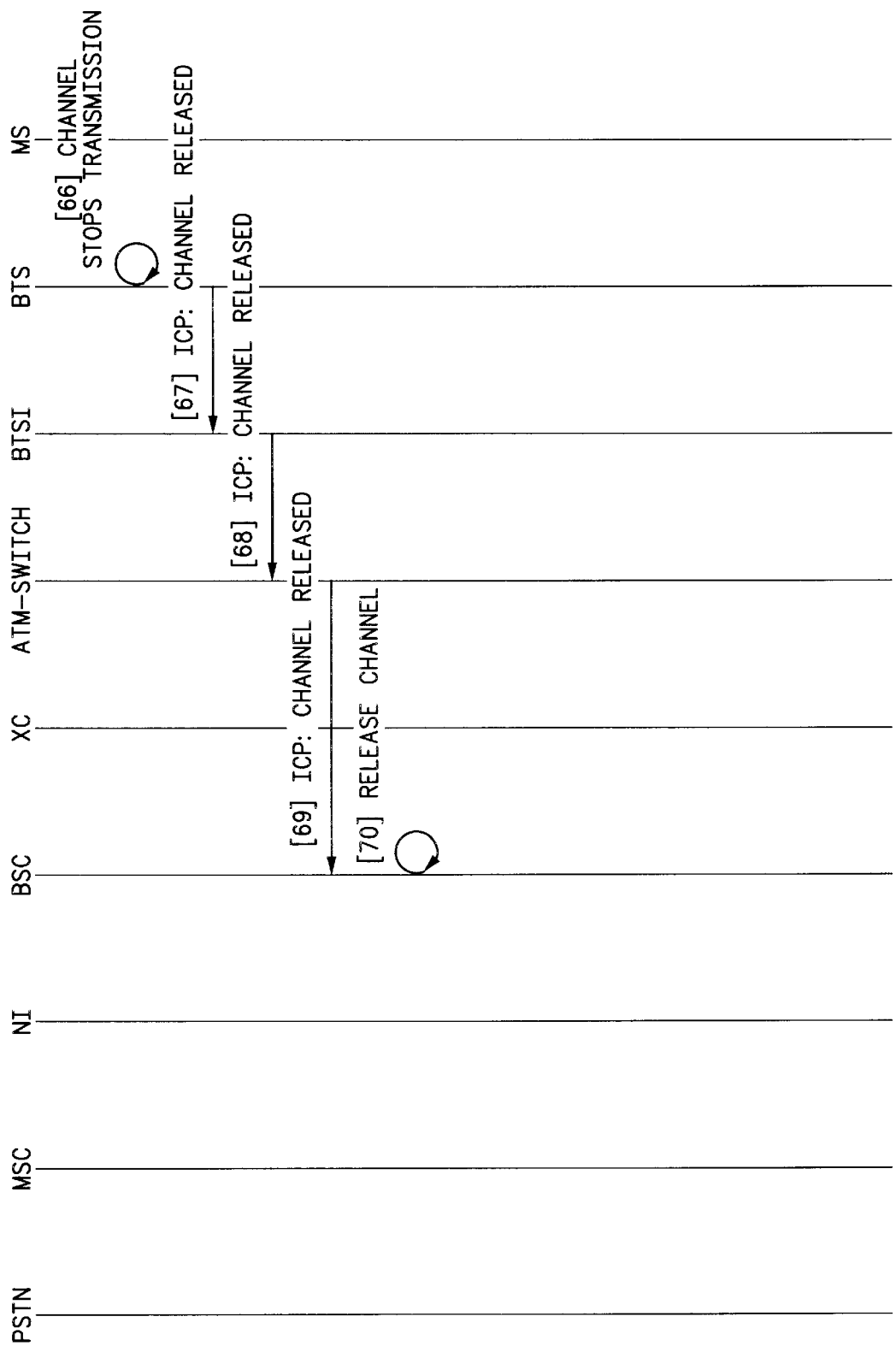
Figure 15A:
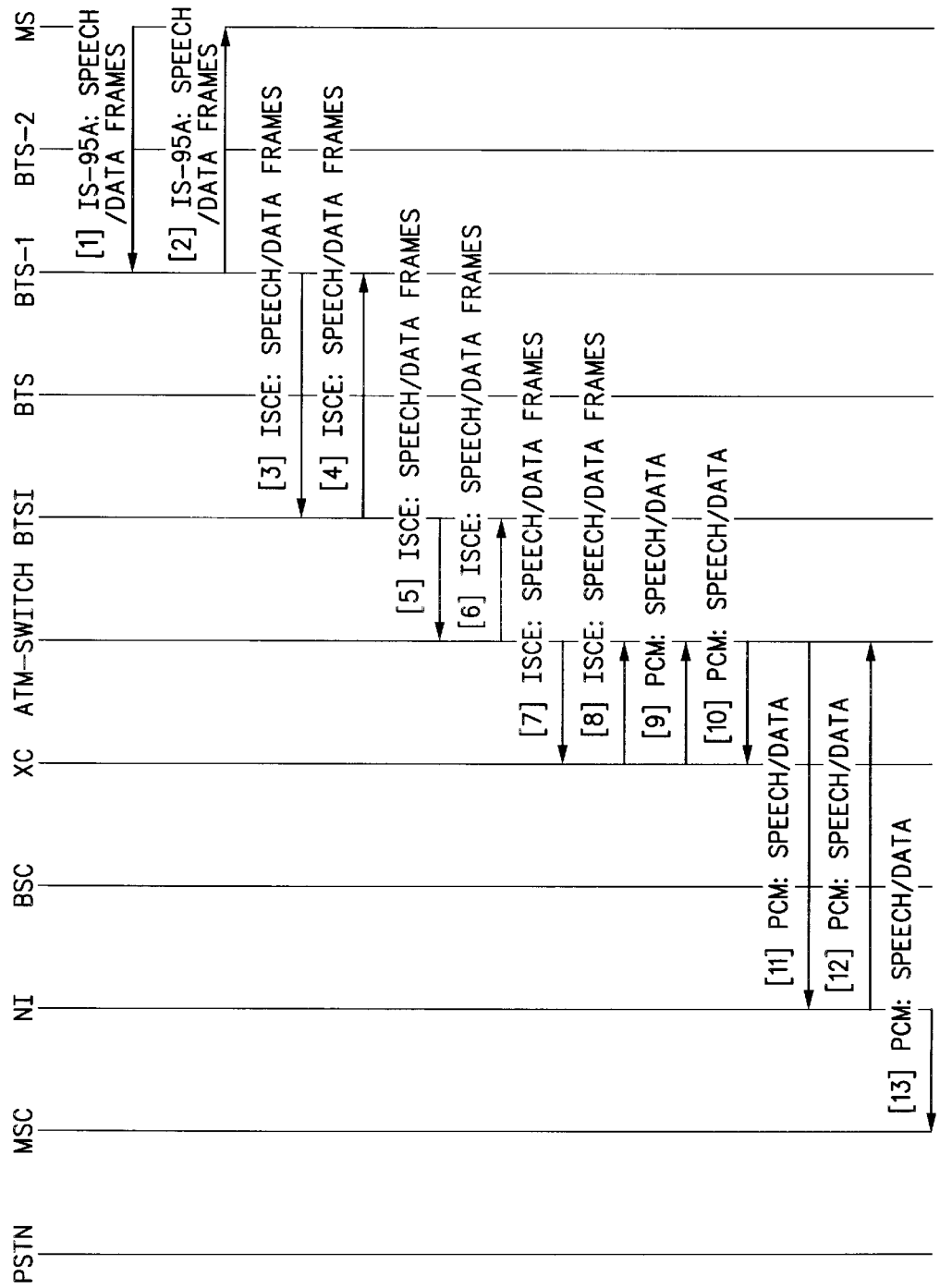
FIGS. 15(a–g) show the CDMA soft handoff "ADD" process, in accordance with the present invention.
Figure 15B:
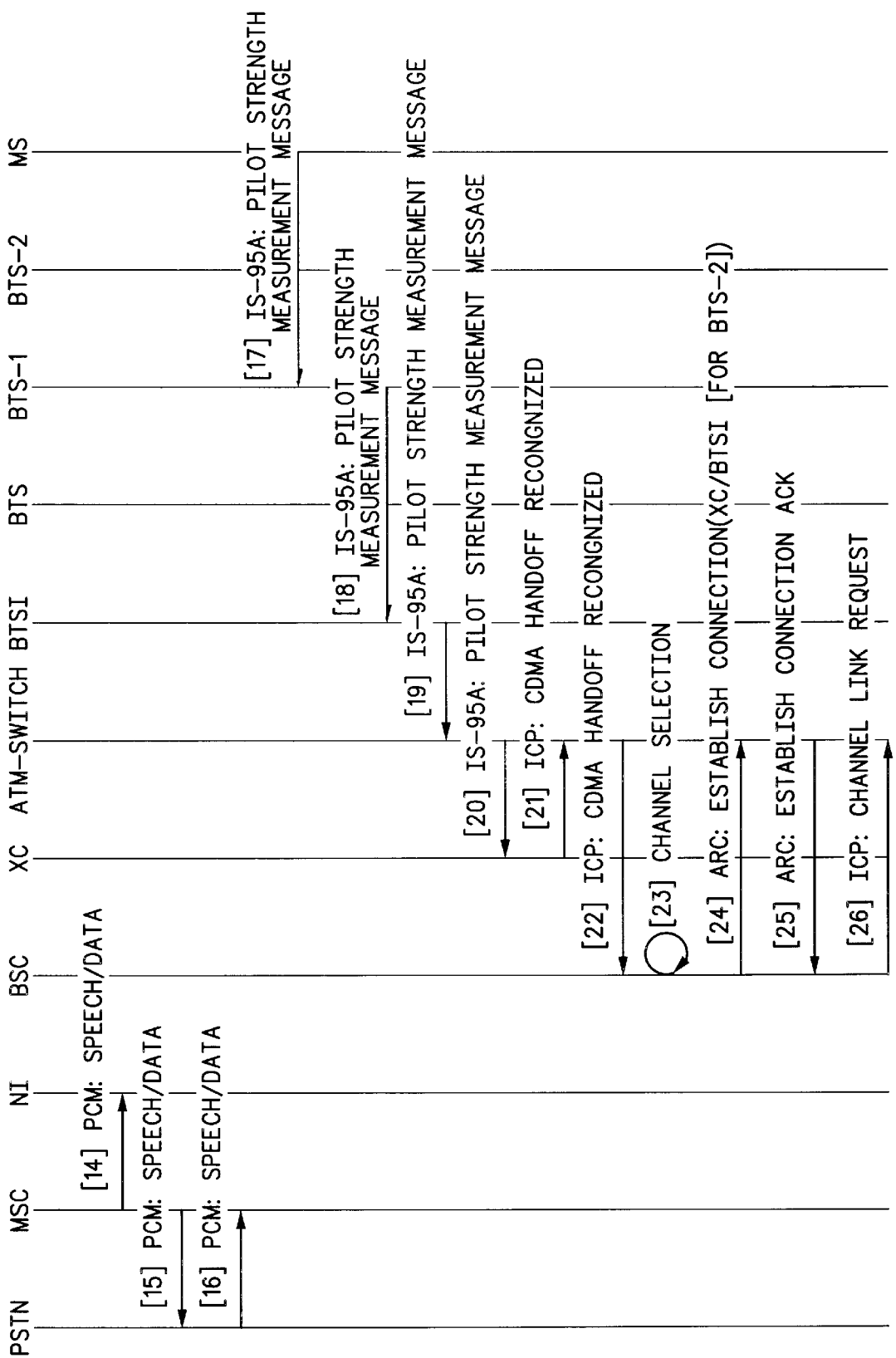
Figure 15C:
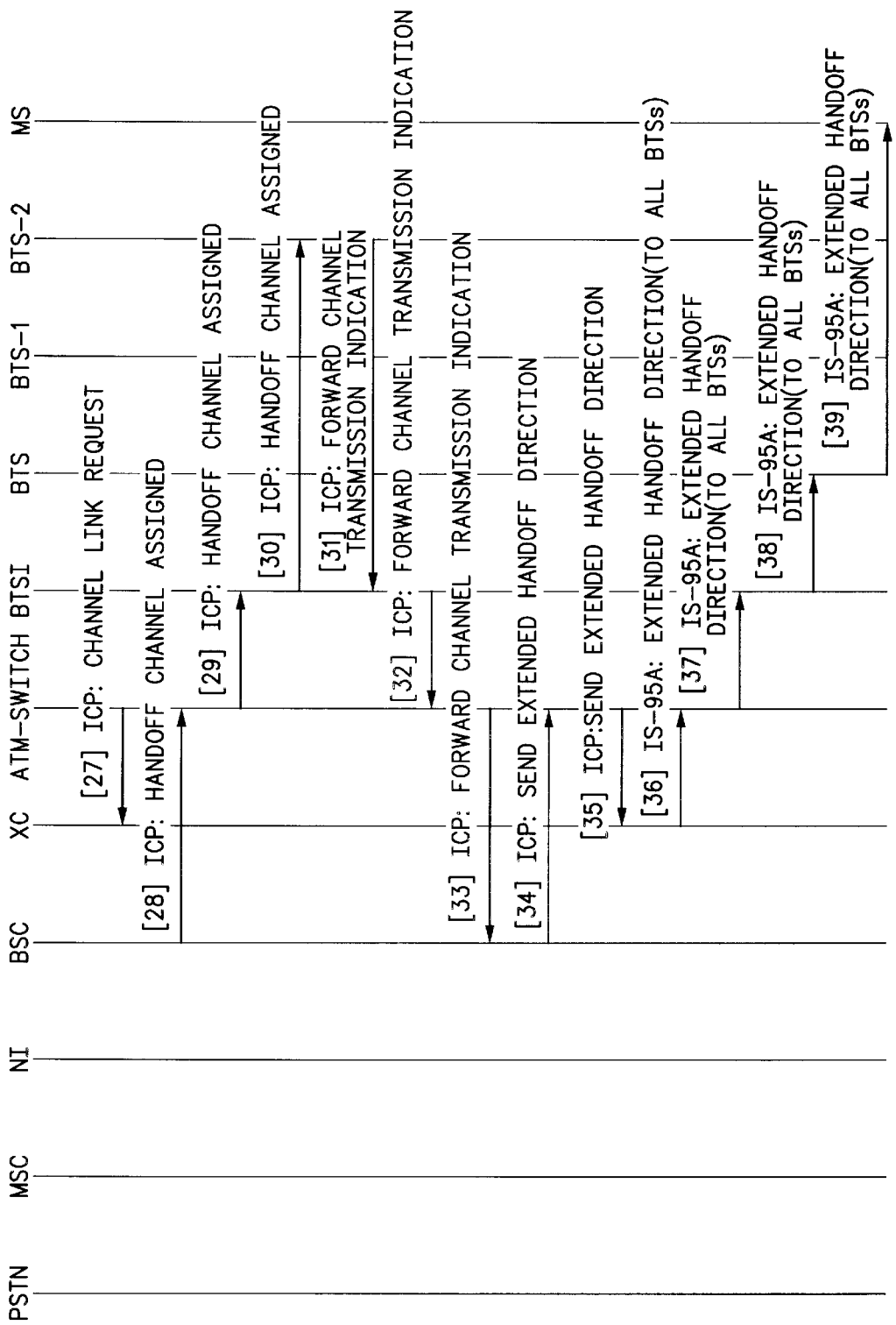
Figure 15D:
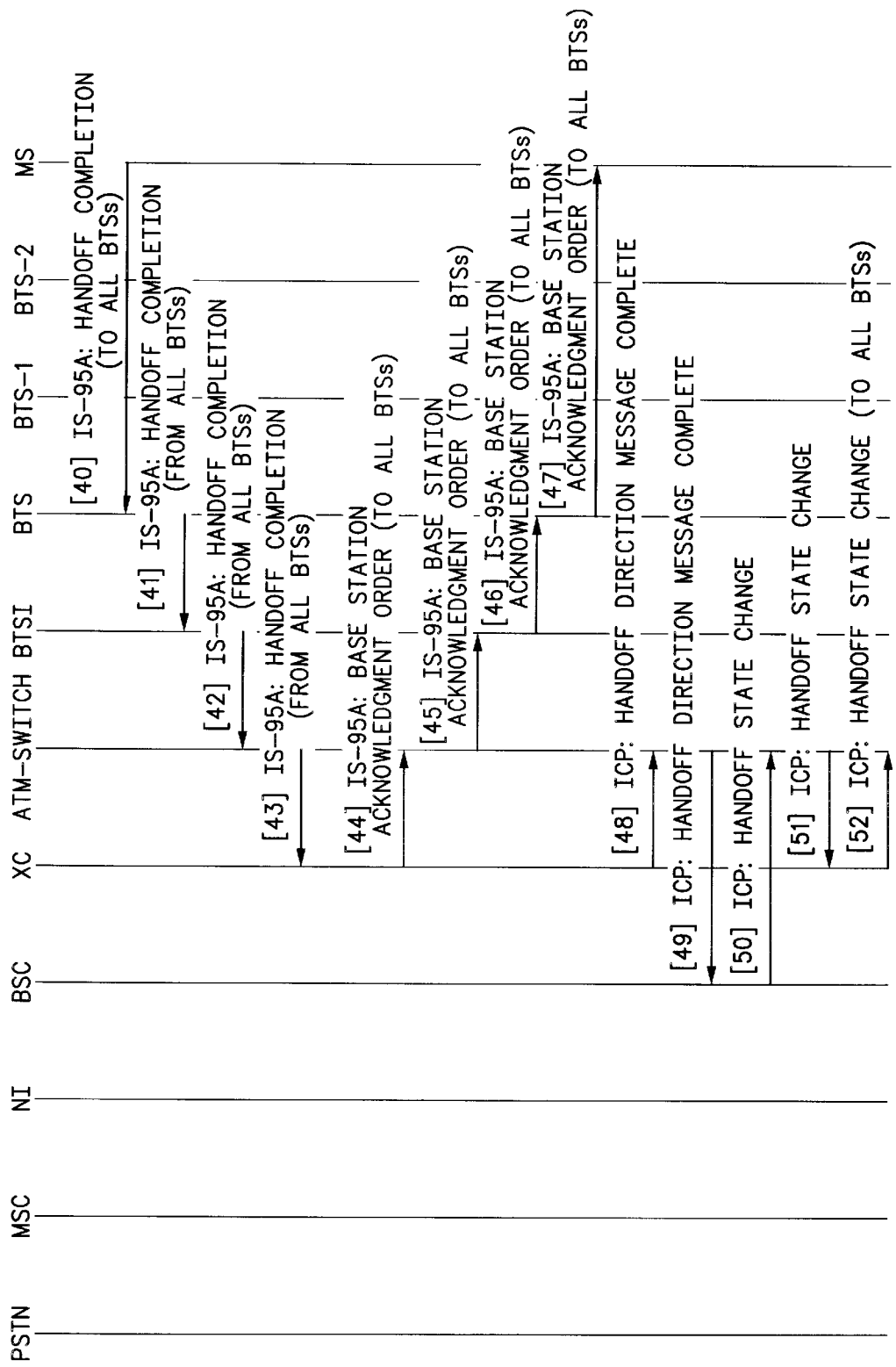
Figure 15E:
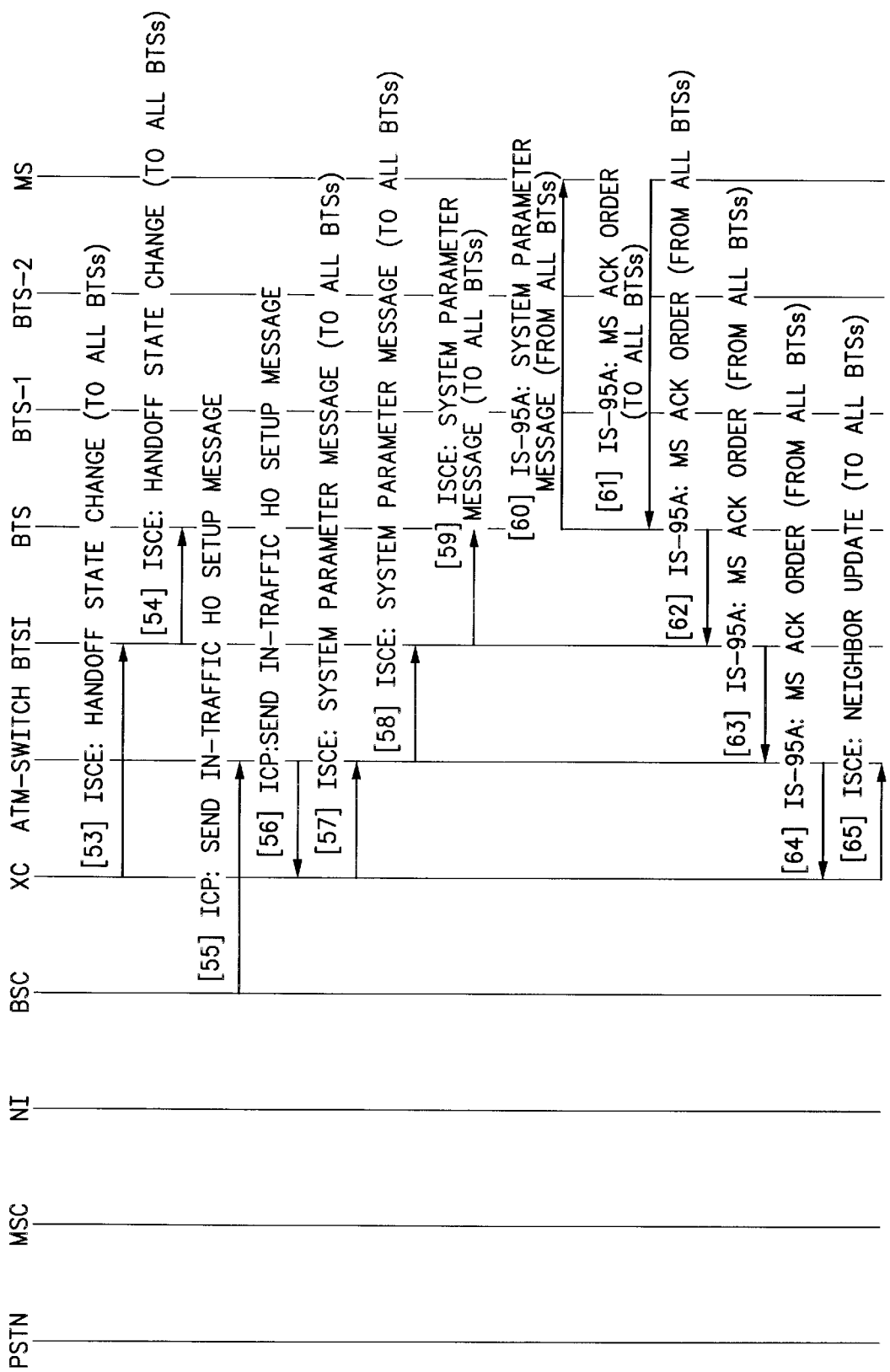
Figure 15F:
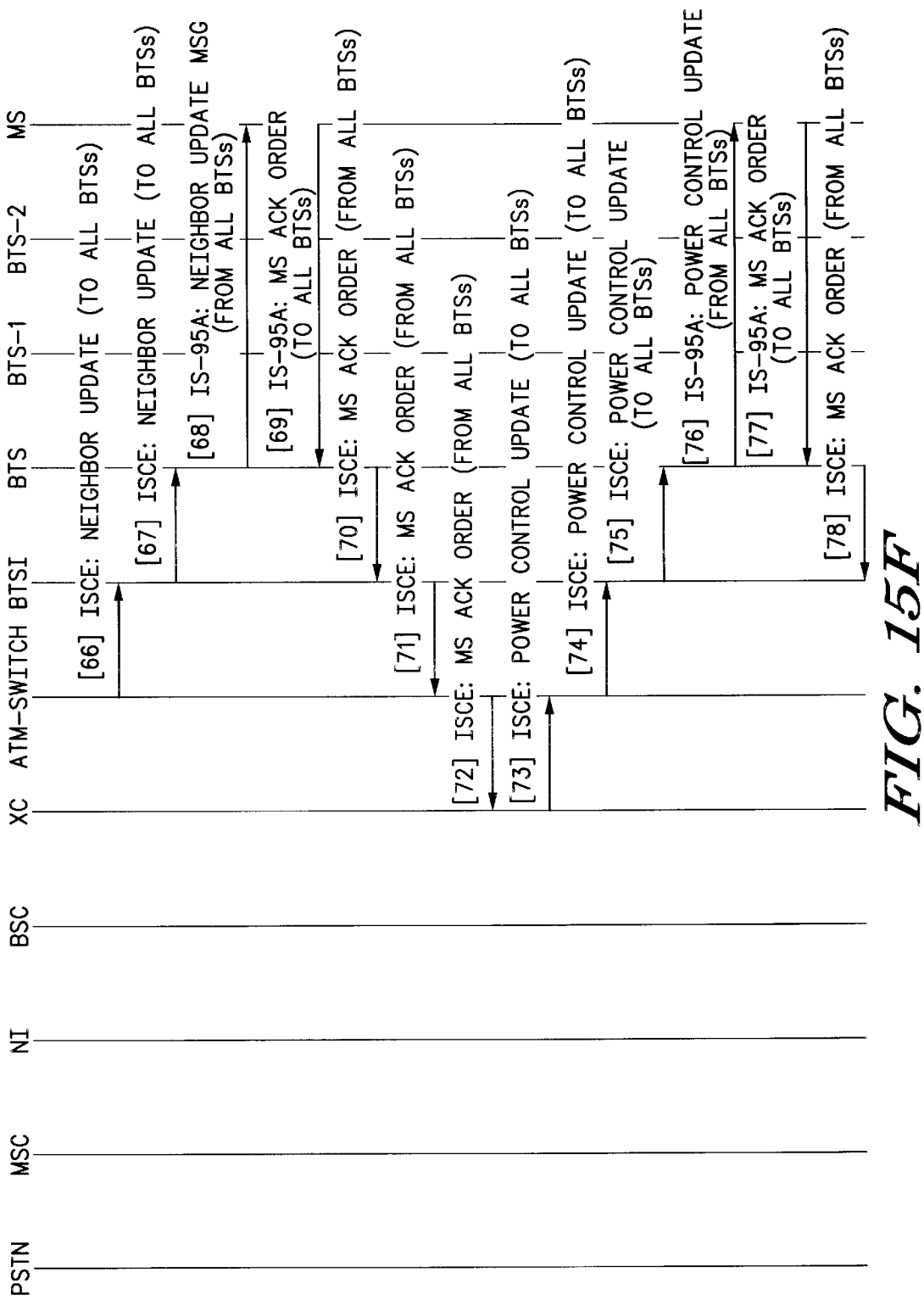
Figure 15G:
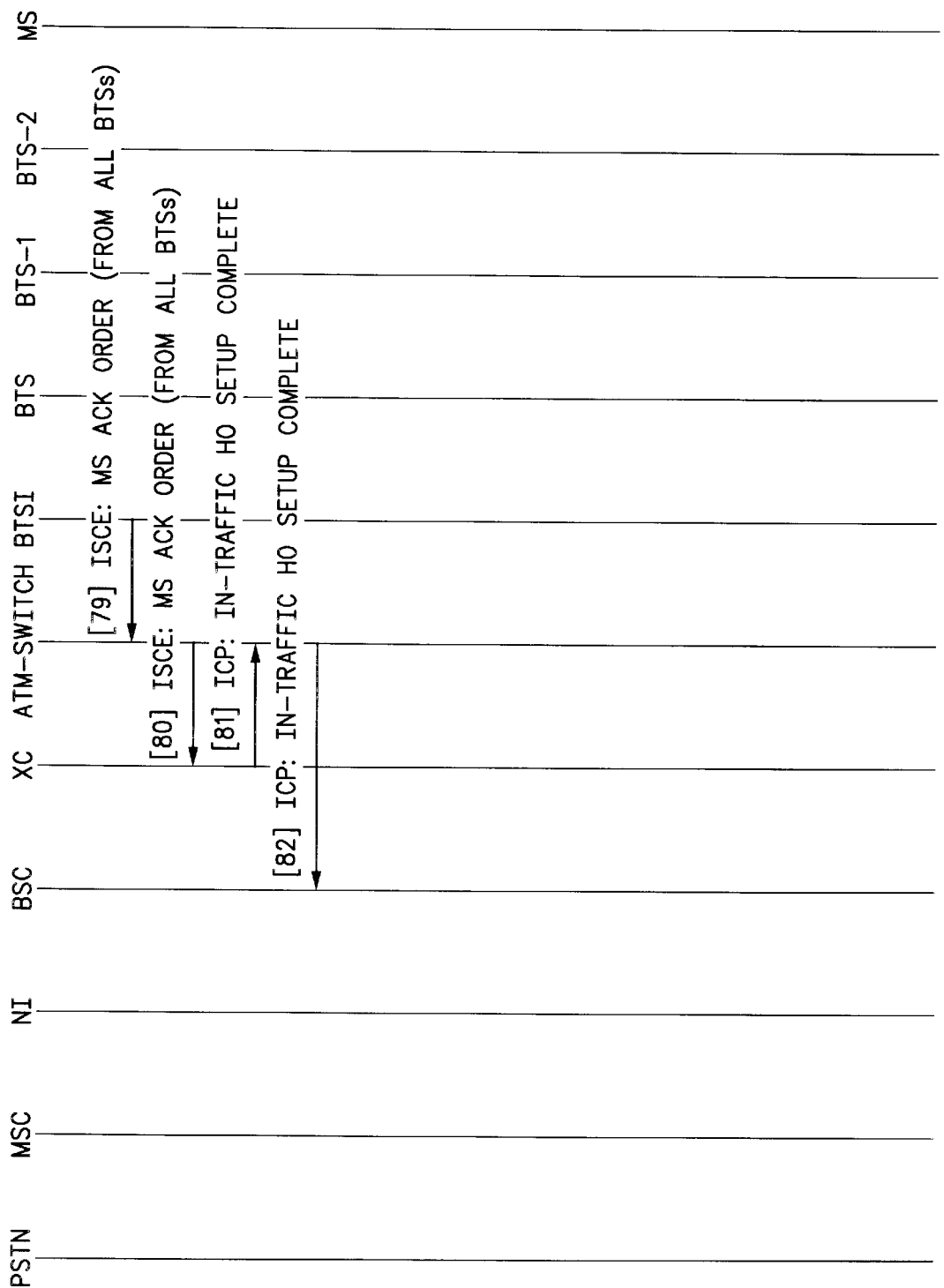

Referring to FIG. 12, in the maintenance mode, the OMC-R monitors the status, via the ATM switch, of the BSC 220 and the XC, BTSI, and NI subsystems of the AXC 250. Starting at step 1 when maintenance mode begins, via the ATM switch 251 at step 2, the OMC-R 210 monitors the XC 252, the BTSI 253, the NI 254, and the BSC 220 at step 3, and maintains history and statistics at step 4. If problems are found at step 5, then they are fixed at step 6, and the system is restarted and/or initialized, and processing returns to step 2. If no problems are found at step 5, then processing simply returns to step 2. The OMC-R 210 then compiles maintenance history and information, and provides for emergency restart in the event of detecting errors or problems in the operation of the base station system 200.

Referring to the ladder diagrams, FIG. 13a–f, 14a–f, 15a–g, the operation of the overall system is illustrated for: mobile origination of a call from the MS—FIG. 13a–f (steps 1–67); mobile subscriber initiated release of a call—FIG. 14a–f (steps 1–70); and CDMA soft handoff—FIG. 15a–g (step 1–82). The ladder diagrams are self contained and are described later in this text.

The Base Transceiver Site subsystem (BTS) 260–263 is responsible for the radio interface equipment and the lower level call processing functions associated with generating and terminating an air interface. The Base Transceiver Site subsystems 260–263 have both packet-based voice and control capabilities.

Conventional Base Transceiver subsystems (not shown) provide only circuit based voice and management interfaces. The Base Transceiver subsystems 260–263 of the present invention provide both a packet based voice and Q3 management interface.

FIGS. 13–15 depict the operation of the system elements from a control and data perspective in the form of ladder diagrams. An IS-95A/IS-634 CDMA system is used as the representative context. However, other standards such as JSTD008/IS-634 as GSM are similarly applicable. Three representative operations are provided:

1. FIGS. 13a–f: CDMA Mobile Subscriber Origination
2. FIGS. 14a–f: CDMA Mobile Subscriber Initiated Release
3. FIGS. 14a–g: CDMA Soft Handoff "Add"

The vertical bars in the ladder diagram correspond to the elements identified in FIG. 1a "System Block Diagram".

PSTN: Public Switch Telephone Network 240

MSC: Mobile Switching Center 230

NI: Network Interface 254

BSC: Base Station Controller 220

XC: Transcoder 252

ATM-Switch: Asynchronous Transfer Mode Switch 251

BTSI: Base Transceiver Subsystem Interface 253

BTS: Base Transceiver Subsystem 260–263

MS: Mobile Subscriber 270, 271

The following convention is used to denote the type of information conveyed with each transition in the ladder diagrams. The physical path(s) in FIG. 1a "System Block Diagram" carrying each type of information is/are denoted.

PCM: Pulse Code Modulation encoded voice/data 290, 291

ISCE: Internal Speech/Data and Control Encoding encoded voice/data used to transport bearer traffic, for example, STRAU: Supercell™ Translation Rate Adaptation Unit 293, 297, 298

IS-95A: Industry Standard CDMA Air Interface Specification between BSS and MS 292, 293, 297, 298

IS-634: A+ Industry Standard Interface Specification between BSS and MSC typically transported by SS7 291, 295, 299

ARC: ATM Routing Control used to control the connection of resources via ATM switching 295

ICP: Internal Control Protocol used, strictly within the BSS, to control the entities comprising the BSS 293, 295, 297, 298.

The following sections describe each procedure and are best read in conjunction with viewing the ladder diagram.

The notation # is used to denote a particular transition in the associated figure.

Referring to FIG. 13, this procedure depicts the operation of a mobile subscriber unit initiating service access to the infrastructure (e.g., placing a voice telephone call). The MS accesses the local BTS via a common signaling channel over IS-95A 1. The BTS receives this access and communicates it to the BSC via the ICP 2, 3, 4. The BSC allocates system resources (XC Voice Processor, BTS Radio Resource) 5, notifies the XC that it has chosen 6, 7, and initiates an ARC transaction to establish the connection between the XC Voice Processor selected and the BTSI connection that is associated with the selected BTS resources 8, 9. The BTS and XC exchange ISCE idle frames while the voice link is established with the MS 10, 11, 12, 13, 14, 15. Upon detecting good ISCE idle frames from the BTS, the XC notifies the BSC of a good BTSI/XC link 16, 17. The BSC then instructs the BTS to assign the chosen resource and communicate this to the MS 18, 19, 20, 21. The mobile begins transmitting speech frames to the XC 22, 23, 214, 25. Upon detecting valid speech frames, the XC initiates an IS-95A acknowledgment order that is conveyed to the MS 26, 27, 28, 29 and acknowledged by the MS 30, 31, 32, 33. The mobile continues to convey speech/data frames via ISCE to the XC 34 35, 36, 37. The XC notifies the BSC that the MS is successfully on channel with good voice/data link between the MS and XCDR VP 38, 39. The BSC then initiates an IS-634 connection request transaction with the MSC 40 41 42 which carries information allowing the MSC to establish the PSTN connections (e.g., dialed digits, etc.) This is acknowledge by the MSC 43, 44, 45. The BSC forwards a call setup message to the MSC 46 47 48 and the MSC responds with a call proceeding message 49 50 51 followed by a channel assignment request 52 53 54. The IS-634 assignment request message carries the MSC assigned trunk for transporting the PCM speech/data between the BSS and MSC>The BSC uses this to ascertain the corresponding NI port and connects this port to the XC via an ARC request 55, 56. AT this point, PCM speech/data can now flow, bi-directionally, between the XC VP and the MSC 57, 58, 59, 60, 61, 62 and to the PSTN when the MSC completes this portion of the call setup 63, 64 (latter is beyond the scope of this discussion). Finally ,the BSC responds to the MSC with an IS-634 Assignment Complete message 65, 66, 67.

The procedure of FIG. 14 depicts the operation of a mobile subscriber unit initiating a release of a connection (e.g., the MS "hangs up"). The initial conditions have the call in conversation state with bidirectional speech/data traffic flowing uplink from e MS to the PSTN via IS-95A, ISCE and PCM 1, 3, 5, 7, 9, 11, 13, 15 and downlink from the PSTN to the MS via PCM, ISCE, and IS-95A 2, 4, 6, 8, 10, 12, 14, 16. For simplicity, the call is now shown in soft handoff. To disconnect, the MS sends an IS-95A release order to the XC 17, 18, 19, 20 which is acknowledged by the XC 21, 22, 23, 24. The MS then stops radio transmission 25 and the associated loss of the air-link is detected by the BTS 26. The BTS generates invalid speech/data frames via ISCE to the XC 27, 28, 29 which causes the XC to initiate a channel state change notification to the BSC 30, 31 via the ICP. The BSC retrieves all per-call summary data accumulated by the XC 32, 33, 34, 35 and then triggers and ICP BTS link request message to the XC 36, 37 which causes the XC to generate null speech/data ISCE frames to the BTS 38, 39, 40 via ISCE and PCM silent tone to the PSTN 41, 42, 43, 44. The BSC initiates an IS-634 release request to the MSC 45, 46, 47 which is acknowledge by the MSC 48, 49, 50. The MSC tears the connection down with the PSTN (details are beyond the scope of this description) 51 and initiates a clear command to the BSC 52, 53, 54. The BSC acknowledges this message via the IS-634 clear complete 55, 56, 57. The BSC then removes the ATM connection between the BTSI (BTS) and the XC 58, 59 as well as the ATM connection between the XC and NI (MSC trunk) 60, 61. The XC VP is released internally by the BSC allowing the VP to the reassigned for subsequent traffic and the BTS radio resources are released via an ICP release channel message from the BSC to the BTS. The radio channel stops transmission at the BTS and acknowledges the release request via an ICP channel released message to the BSC. The BSC then internally releases the radio resources allowing them to be reassigned for subsequent traffic.

The procedure of FIG. 15 depicts the operation of adding a CDMA soft handoff leg to an already established call. In reference to FIG. 15, the call is already established with BTS number 1 (BTS-1) and a soft handover leg is to be added to BTS number 2 (BTS-2). For messages that are common to both BTS-1 and BTS-2, the ladder diagram shows an interaction with BTS. The initial conditions have the call in conversation state with bi-directional speech/data traffic flowing uplink from the MS to the PSTN via IS-95A, ISCE and PCM 1, 3, 5, 7, 9, 11, 13, 15 and downlink from the PSTN to the MS via PCM, ISCE, and IS-95A 2, 4, 6, 8, 10, 12, 14, 16. The MS triggers the handoff by sending an IS-95A pilot strength measurement message to the XC 17, 18, 19, 20. The XC evaluates the MS's conditions relative to thresholds and recommends a handoff to the BSC via the ICP CDMA handoff recognized message 21, 22. The BSC considers the XC recommendation, chooses to allocates the necessary radio resources for BTS-2 23 and initiates a connection between the XC VP and chosen BTS-2 channel element (BTSI) via an ARC transaction 24, 25. The BSC informs the XC of handoff assignment via an ICP channel link request 26, 27 and then informs BTS-2 of the handoff 28, 29, 30 via the ICP handoff channel assigned. Upon successful initiation of channel transmission, BTS-2 acknowledges with an ICP forward channel transmission indication 31, 32, 33. The BSC forwards an ICP extended handoff direction message to the XC to initiate the handoff with the MS 33, 34. The XC then forwards this to the MS through all BTSs via an IS-95A extended handoff direction message 36, 37, 38, 39. The MS acknowledges the handoff direction via the IS-95A handoff completion uplink from each BTS 40, 41, 42, 43. The XC then forwards an IS-95A base station acknowledgment order to the MS to complete IS-95A the handoff transaction with the MS 44, 45, 46, 47 as well as an ICP handoff direction message complete message to the BSC 48, 49. At this point the second radio link (BTS-2) has been established with the MS. The BSC then notifies all BTSs participating in the call of the handoff by forwarding the ICP handoff state change message to the XC 50, 51 which results in the XC forwarding the handoff state change indication to each BTS via ISCE 52, 53, 54. The BSC then updates the XC, BTSs, and MS of changes to system parameters, cell neighbors/topology, and power control parameters/thresholds that are recalculated as a result of the changed call configuration by forwarding an ICP send in-traffic handoff setup message to the XC 55, 56. The XC then sends a ISCE system parameter update message to the BTSs 57, 58, 59 which results in an IS-95A system parameter message to the MS 60. The MS acknowledges the system parameter message to the XC via an IS-95A MS acknowledgment order 61, 62, 63, 64. This type of update transaction is repeated by the XC for the neighbor update 65, 66, 67, 68 and power control update 73, 74, 75, 76 with both being acknowledged 69, 70 71, 72 and 77, 78, 79, 80, respectively, by the MS. Finally, the XC acknowledges the BSC in traffic setup handoff request via the ICP in-traffic handoff complete message 81, 82.

What is claimed is:

1. A bas station system (BSS) comprising:
   a base station controller (BSC) and an ATM transcoder hub (AXC), the AXC providing means for communicating between external mobile subscriber subsystems (MS) and a public switched telephone network (PSTN), wherein the BSC provides means for communicating with and controlling the AXC,
   wherein the AXC provides a first set of signals to the BSC to direct the base station controller as to call flow management data; and
   a wherein the BSC is responsive to the first set of signals from the AXC to generate a second set of signals coupled to the AXC, to provide control of transcoding and conversion necessary to communicate between the mobile subscriber subsystems generating data in an air interface communications format and a data source generating data in a format compatible with the PSTN.

2. The system as in claim 1, wherein the communication between the PSTN and the AXC is in an ATM format.

3. The system as in claim 1, wherein the BSC provides control and sequencing of all call control operations for the BSS.

4. The system as in claim 3, wherein the call control operations occur substantially in real-time.

5. The system as in claim 3, wherein the call control operations comprise call setup, breakdown, and hand-off among the AXC, a Base Transceiver Subsystem (BTS), and a Mobile Switching Center (MSC).

6. The system as in claim 5, wherein the BTS performs CDMA IS-95A overhead messaging.

7. The system as in claim 1, wherein the BSC performs at least one task selected from the group consisting of BTS radio resource allocation and deallocation, AXC voice processor allocation, per-call performance record collection, and MSC trunk allocation.

8. The system as in claim 1, wherein control messages for communicating control information regarding call setup, teardown, sequencing and hand-off are carried over an ATM cell format.

9. The system as in claim 1, wherein the BSC, the AXC, and the BTS are directed by an operations and maintenance center-radio (OMC-R) to effect operations, administration, maintenance, and provisioning operations comprising initialization, configuration management, software loading, device state management, alarm reporting, fault management, traffic and engineering statistics aggregation.

10. The system as in claim 1, wherein the first and second set of signals are in an ATM format.

11. The system as in claim 10, wherein the AXC is further comprised of:
   a transcoder subsystem (XC) for transcoding communicated data between the air interface communications format and the call management protocol format;
   a mobile subscriber controller network interface subsystem (NI), comprising means for interfacing to the MS and therefrom to the PSTN, and a mobile subscriber interface further comprising a Base Transceiver Subsystem Interface (BTSI) providing means for coupling to and from a Base Transceiver Subsystem (BTS), which BTS interfaces with the MS in response to mobility management control information provided by the BSC in the second set of signals.

12. The system as in claim 11, wherein said BTS communicates data in a BTS format, and wherein said BTSI provides conversion between the BTS format and the ATM format.

13. The system as in claim 12, wherein said BTSI is responsive to said BSC for providing conversion between the ATM format and the BTS format to communicate control data to the BTS;
   wherein the BTSI allocates bandwidth and priority for coupling the mobility management control information to the BTS; and
   wherein the BTSI converts between the ATM format and the BTS format, including protorcol conversion.

14. The system as in claim 13, wherein each MS registers its presence for at least one BTS;
   wherein the PSTN originates a call that generates a page message requesting a specific MS; and
   wherein the BTSI provides selective broadcast of the page message to the BTS for which the MS has registered its presence.

15. The system as in claim 1, wherein a first MS communicates using an air interface communications format and the AXC further comprises means for converting between the air interface communications format and an ATM format.

16. The system as in claim 15, wherein the air interface communications format is a circuit encapsulated format and wherein the first set of signals from the AXC are in packet format, wherein the BSS is further comprised of means to convert from the packet format to circuit encapsulation format when a destination is on a circuit-based system.

17. The system as in claim 16, wherein the circuit encapsulated format is substantially as set forth in IS-634.

18. A base communications switching system (BSS) for use in coupling a wireless communication system for communicating encoded digital data between a mobile subscriber (MS) and a circuit based public switch telephone system (PSTN), the system comprising:
   a base station controller (BSC), an ATM-based transcoding subsystem (AXC), and a base transceiver subsystem (BTS);
   said system providing for interface to an external source of the encoded digital data coupled from the PSTN, and additionally providing coupling to the MS, for communicating the encoded digital data between the MS and the PSTN;
   wherein the BSC provides for mobility management of coupling the encoded digital data between a PSTN source and the MS, independent of mobility characteristics of the MS;
   wherein the AXC is further comprised of an ATM switch, a transcoder (XC), a base transceiver system interface (BTSI), and a network interface subsystem (NI), wherein the ATM switch is coupled to each of the BSC, the XC, the BTSI, and the NI, and provides means for coupling and communicating the encoded digital data in an ATM format between subsystems coupled thereto;
   wherein the NI is coupled to receive data originating from the PSTN source and to receive data in the ATM format from the ATM switch;
   means for conversion of format between circuit based communication from the PSTN and data in the ATM format of ATM communication via the ATM switch;

wherein the BTSI is coupled to receive signals originating from the MS, and the BTSI provides means for coupling to the MS via the BTS, wherein communications between the BTS and the MS is provided in a digital signal air interface protocol (DSAIP), which is coupled via the BTS to the BTSI, wherein the BTSI provides means for converting the DSAIP to the ATM format to provide ATM cell data for coupling to the ATM switch for communication of the ATM cell data to the transcoder (XC);

wherein, for signals originating from the PSTN source, the BTSI provides means for converting from the ATM format to a second ATM format compatible with the BTS, and these signals are converted back into the ATM format for communication to the BTSI and for communication therefrom to the BTS and therefrom to the MS; and wherein the transcoder (XC) provides means for converting the digital signal air interface protocol (DSAIP) to a second defined protocol required by the PSIN for communication from the MS to the PSTN and means for converting a PCM-based protocol into the DSAIP for communication from the PSTN to the MS.

19. The system as in claim 18, further comprising an operations and maintenance controller (OMC) for initializing each of the transcoder (XC), the BTSI, the NI, and the BSC subsystems, wherein the OMC is coupled to the BSC and the AXC via the ATM switch within the AXC.

20. The system as in claim 19, wherein said OMC further comprises an ATM link for communication of control and information data as ATM cells for providing maintenance and control functions for the AXC and wherein the OMC provides for initialization of the AXC and the BSC.

21. The system as in claim 18, wherein the BSC further comprises means for providing real time control of call setup, soft hand off and call teardown, wherein the BSC comprises an ATM link for communication of control data as ATM cells, and wherein the BSC provides for real time operational control of the AXC.

22. The system as in claim 18, wherein the AXC is further comprised of ATM link interfaces for coupling to ATM links of the BSC and OMC, and wherein the AXC further comprises converter interface means for converting between a plurality of separate air communications protocols from the MS to an ATM data format for use within the AXC.

23. The system as in claim 22, wherein the BTSI further comprises means for providing an interface to at least one of a circuit based base transceiver subsystem and a cell based base transceiver subsystem.

24. The system as in claim 22, wherein the NI further comprises means for data translation of the ATM format to an external circuit encoding format.

25. The system as in claim 18, further comprising means for maintaining operations status of each of the XC, the NI, and the BTSI.

26. The system as in claim 18, further comprising means for selectively controlling BSS operation, so as to provide one of power-up and power-down functions.

27. The system as in claim 18, wherein the mobile subscriber is comprised of a plurality of mobile subscribers, wherein the BSC provides for mobility management of coupling the encoded digital data between the PSTN source and any one of the plurality of mobile subscribers, independent of mobility characteristics of the plurality of mobile subscribers.

28. The system as in claim 18, wherein the NI further comprises means for translation of the ATM format to an external circuit encoding format.

29. The system as in claim 18, wherein the NI is coupled to an external Mobile Switching Center (MSC).

30. The system as in claim 18, wherein the encoded digital data is representative of digitized voice.

31. The system as in claim 18, wherein the encoded digital data is representative of information content.

32. The system as in claim 31, wherein the information content is at least one of voice, fax data, computer data, image data, and multimedia data comprised of control and information data.

33. The system as in claim 18, an initialization step comprises one 20 selected from the group consisting of initializing an address translation table for mapping digital data input to output, and downloading geographical relationships of two or more BTSs to provide a mapping relative to corresponding BTS addresses for handoff purposes.

34. The system as in claim 18, wherein the BTSI is further comprised of means for providing an interface to at least one of a circuit-based and packet-based Base Transceiver Subsystem (BTS).

35. The system as in claim 18, wherein the BSC provides substantially real time dynamic control of connections provided by the ATM switch between the ATM switch, and a plurality of the BTSIs, and wherein the BSC provides means for managing connections that are required to allow mobile station movement amongst a plurality of the BTSs, to thereby provide communication of digital data between the MS and the PSTN independent of a change in location of the MS during said communication.

36. The system as in claim 35, wherein the substantially real-time dynamic control is comprised of at least one selected from the group consisting of connection setup, connection teardown, hand-off management, MS registration, and MS authentication.

37. A base station system (BSS) for coupling to a mobile switching center (MSC) using a first data format and to a base transceiver subsystem (BTS) using a second data format, said BSS comprising:

a base station controller (BSC) providing:
means for providing mobility management for managing a transfer of information content with a wireless transceiver;
means for providing real time control of call setup, hand-off and call teardown functions;
wherein the BSC has a first ATM link for communication of control data as ATM cells;
an operations maintenance control subsystem (OMC), having a second ATM link for communication control data and information content as ATMI cells for providing maintenance and control functions;
an ATM switch, transcoder, and control center (AXC);
wherein the AXC is further comprised of ATM link interfaces for coupling to the first and second ATM links;
wherein the BSC provides for real-time operational control of the AXC; and
wherein the AXC is comprised of means for interfacing between the MSC and the AXC using the first data format and means for interfacing between the BTS and the AXC using the second data format.

38. The system as in claim 37, wherein the AXC is further comprised of a converter interface means for converting between a plurality of separate air communications protocols from the MSC to an ATM data format for use within the AXC.

* * * * *

UNITED STATES PATENT AND TRADEMARK OFFICE
CERTIFICATE OF CORRECTION

PATENT NO. : 6,034,950
DATED : March 7, 2000
INVENTOR(S) : Sauer et al.

It is certified that error appears in the above-indentified patent and that said Letters Patent is hereby corrected as shown below:

In Column 23, line 19, Please replace the word "PSIN" with the corrected word "PSTN".

In Column 24, line 48, Please replace the word "ATMI" with the corrected word "ATM".

Signed and Sealed this

Seventeenth Day of April, 2001

Attest:

NICHOLAS P. GODICI

Attesting Officer

Acting Director of the United States Patent and Trademark Office